United States Patent
Winarski

(10) Patent No.: US 11,239,999 B1
(45) Date of Patent: Feb. 1, 2022

(54) BLOCKCHAIN NETWORK COMMUNICATIONS SYSTEM

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 218 days.

(21) Appl. No.: 15/961,878

(22) Filed: Apr. 25, 2018

(51) Int. Cl.
*H04L 9/06* (2006.01)
*H04L 29/08* (2006.01)
*H04L 9/32* (2006.01)

(52) U.S. Cl.
CPC .......... *H04L 9/0637* (2013.01); *H04L 9/0643* (2013.01); *H04L 67/10* (2013.01); *H04L 9/3265* (2013.01)

(58) Field of Classification Search
CPC ....... H04L 9/0637; H04L 9/0643; H04L 9/06; H04L 67/10; H04L 63/04; H04L 63/12; H04L 63/123; H04L 63/126; H04L 63/14; H04L 63/1408; H04L 63/18; H04L 63/20
See application file for complete search history.

(56) References Cited

U.S. PATENT DOCUMENTS

| | | | |
|---|---|---|---|
| 9,392,020 B2* | 7/2016 | Twitchell, Jr. | H04L 63/04 |
| 2017/0359288 A1* | 12/2017 | Golan | G06F 16/9024 |
| 2018/0097635 A1 | 4/2018 | Moses | |
| 2019/0014124 A1* | 1/2019 | Reddy | H04L 63/108 |
| 2019/0205889 A1* | 7/2019 | Cantrell | H04L 9/3236 |
| 2019/0273623 A1* | 9/2019 | Biyani | H04L 9/12 |
| 2019/0289019 A1* | 9/2019 | Thekadath | H04L 9/3239 |
| 2019/0306129 A1* | 10/2019 | Waltermann | H04L 9/0637 |
| 2019/0312831 A1* | 10/2019 | Gupta | H04L 9/3236 |
| 2020/0366495 A1* | 11/2020 | Mahoney | H04L 9/12 |

FOREIGN PATENT DOCUMENTS

EP   3486855 A1   5/2019

* cited by examiner

*Primary Examiner* — Kristine L Kincaid
*Assistant Examiner* — Shaqueal D Wade-Wright
(74) *Attorney, Agent, or Firm* — The Winarski Firm, PLLC

(57) ABSTRACT

The present patent application discloses a distributed network system for communications via messaging based on blockchains. Utilizing blockchains for network messaging allows for various security systems to ensure that messages are not intercepted in a man-in-the-middle attack, or other form of hacking. An electronic message formed of a blockchain includes a genesis block containing as data an electronic message and identifying information of a sender terminal that generated the electronic message. The blockchain also includes a plurality of blockchain blocks containing identifying information of devices that transmitted the electronic message through a distributed network. The blockchain also includes a recipient block containing identifying information of a recipient terminal to which the electronic message was sent.

20 Claims, 22 Drawing Sheets

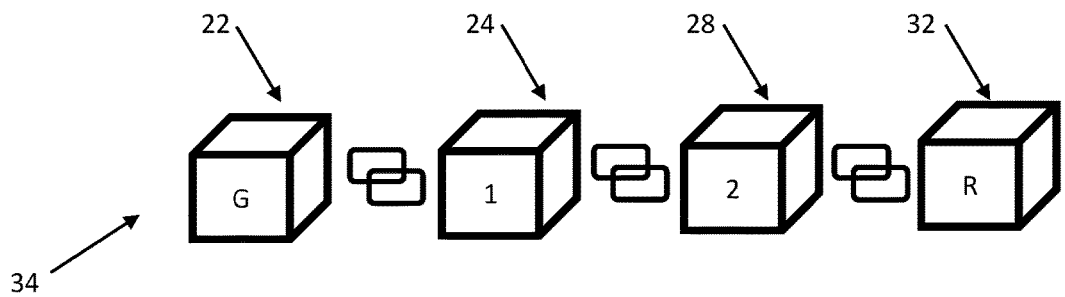

| GENESIS BLOCK 22 | INFORMATION IN BLOCK:<br>*HASH OF CURRENT BLOCK<br>*DATA:<br>- MESSAGE – (SENDER ADDRESS, RECEIVER ADDRESS, MESSAGE BODY)<br>- STATIC NETWORK ID OF SENDER NODE |
|---|---|
| FIRST NODE BLOCK 24 | INFORMATION IN BLOCK:<br>*HASH OF PREVIOUS BLOCK (GENESIS) AND HASH OF CURRENT BLOCK<br>*DATA:<br>- STATIC NETWORK ID OF DISTRIBUTED NETWORK NODE 1 |
| SECOND NODE BLOCK 28 | INFORMATION IN BLOCK:<br>*HASH OF PREVIOUS BLOCK (FIRST NODE) AND HASH OF CURRENT BLOCK<br>*DATA:<br>- STATIC NETWORK ID OF DISTRIBUTED NETWORK NODE 2 |
| RECIPIENT BLOCK 32 | INFORMATION IN BLOCK:<br>*HASH OF PREVIOUS BLOCK (SECOND NODE) AND HASH OF CURRENT BLOCK<br>*DATA:<br>- STATIC NETWORK ID OF RECIPIENT NODE |

FIG. 2

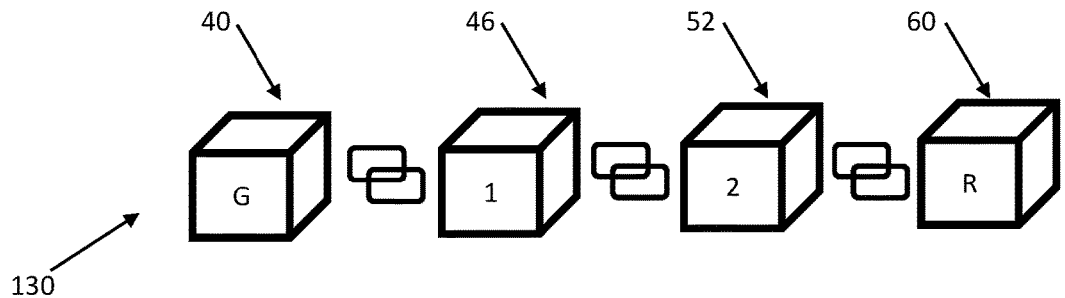

| GENESIS BLOCK 40 | INFORMATION IN BLOCK:<br>*HASH OF CURRENT BLOCK<br>*DATA:<br>- MESSAGE – (SENDER ADDRESS, RECEIVER ADDRESS, MESSAGE BODY)<br>- SENDER DYNAMIC ID GT1 BLOCK WITH TIME T1 |
|---|---|
| FIRST NODE BLOCK 46 | INFORMATION IN BLOCK:<br>*HASH OF PREVIOUS BLOCK (GENESIS) AND HASH OF CURRENT BLOCK<br>*DATA:<br>- DISTRIBUTED NETWORK NODE 1 DYNAMIC ID 1T2 BLOCK WITH TIME T2 |
| SECOND NODE BLOCK 52 | INFORMATION IN BLOCK:<br>*HASH OF PREVIOUS BLOCK (FIRST NODE) AND HASH OF CURRENT BLOCK<br>*DATA:<br>- DISTRIBUTED NETWORK NODE 2 DYNAMIC ID 2T3 BLOCK WITH TIME T3 |
| RECIPIENT BLOCK 60 | INFORMATION IN BLOCK:<br>*HASH OF PREVIOUS BLOCK (SECOND NODE) AND HASH OF CURRENT BLOCK<br>*DATA:<br>- RECIPIENT DYNAMIC ID RT4 BLOCK WITH TIME T4 |

FIG. 6

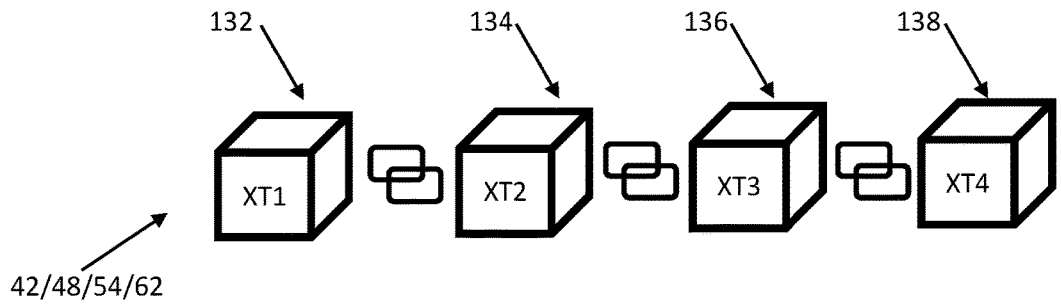

| | |
|---|---|
| BLOCK XT1 132 | INFORMATION IN BLOCK:<br>*HASH OF CURRENT BLOCK<br>*DATA:<br>- DYNAMIC NETWORK ID OF NODE X AT TIME T1 |
| BLOCK XT2 134 | INFORMATION IN BLOCK:<br>*HASH OF PREVIOUS BLOCK (XT1) AND HASH OF CURRENT BLOCK<br>*DATA:<br>- DYNAMIC NETWORK ID OF NODE X AT TIME T2 |
| BLOCK XT3 136 | INFORMATION IN BLOCK:<br>*HASH OF PREVIOUS BLOCK (XT2) AND HASH OF CURRENT BLOCK<br>*DATA:<br>- DYNAMIC NETWORK ID OF NODE X AT TIME T3 |
| BLOCK XT4 138 | INFORMATION IN BLOCK:<br>*HASH OF PREVIOUS BLOCK (XT3) AND HASH OF CURRENT BLOCK<br>*DATA:<br>- DYNAMIC NETWORK ID OF NODE X AT TIME T4 |

FIG. 7

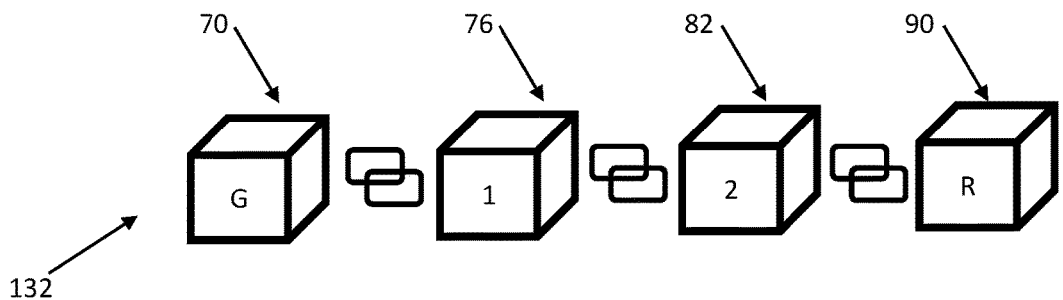

| GENESIS BLOCK 70 | INFORMATION IN BLOCK:<br>*HASH OF CURRENT BLOCK<br>*DATA:<br>- MESSAGE – (SENDER ADDRESS, RECEIVER ADDRESS, MESSAGE BODY)<br>- STATIC NETWORK ID OF SENDER NODE<br>- NETWORK CLOCK NT1 BLOCK WITH TIME T1 |
|---|---|
| FIRST NODE BLOCK 76 | INFORMATION IN BLOCK:<br>*HASH OF PREVIOUS BLOCK (GENESIS) AND HASH OF CURRENT BLOCK<br>*DATA:<br>- STATIC NETWORK ID OF DISTRIBUTED NETWORK NODE 1<br>- NETWORK CLOCK NT2 BLOCK WITH TIME T2 |
| SECOND NODE BLOCK 82 | INFORMATION IN BLOCK:<br>*HASH OF PREVIOUS BLOCK (FIRST NODE) AND HASH OF CURRENT BLOCK<br>*DATA:<br>- STATIC NETWORK ID OF DISTRIBUTED NETWORK NODE 2<br>- NETWORK CLOCK NT3 BLOCK WITH TIME T3 |
| RECIPIENT BLOCK 90 | INFORMATION IN BLOCK:<br>*HASH OF PREVIOUS BLOCK (SECOND NODE) AND HASH OF CURRENT BLOCK<br>*DATA:<br>- STATIC NETWORK ID OF RECIPIENT NODE<br>- NETWORK CLOCK NT4 BLOCK WITH TIME T4 |

FIG. 10

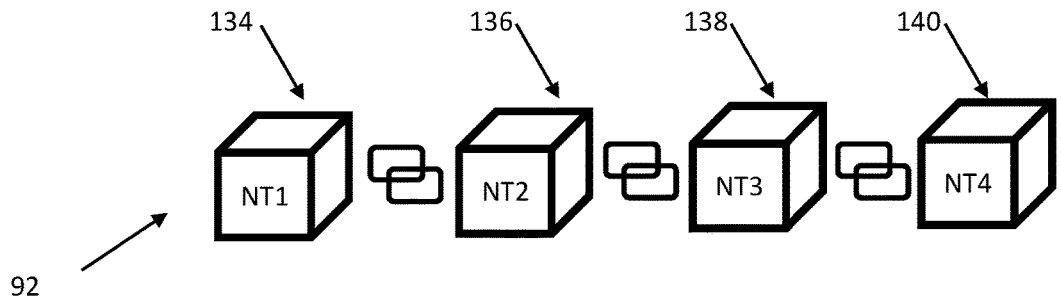

| BLOCK NT1 134 | INFORMATION IN BLOCK:<br>*HASH OF CURRENT BLOCK<br>*DATA:<br>- NETWORK CLOCK WITH TIME T1 |
|---|---|
| BLOCK NT2 136 | INFORMATION IN BLOCK:<br>*HASH OF PREVIOUS BLOCK (NT1) AND HASH OF CURRENT BLOCK<br>*DATA:<br>- NETWORK CLOCK WITH TIME T2 |
| BLOCK NT3 138 | INFORMATION IN BLOCK:<br>*HASH OF PREVIOUS BLOCK (NT2) AND HASH OF CURRENT BLOCK<br>*DATA:<br>- NETWORK CLOCK WITH TIME T3 |
| BLOCK NT4 140 | INFORMATION IN BLOCK:<br>*HASH OF PREVIOUS BLOCK (NT3) AND HASH OF CURRENT BLOCK<br>*DATA:<br>- NETWORK CLOCK WITH TIME T4 |

FIG. 11

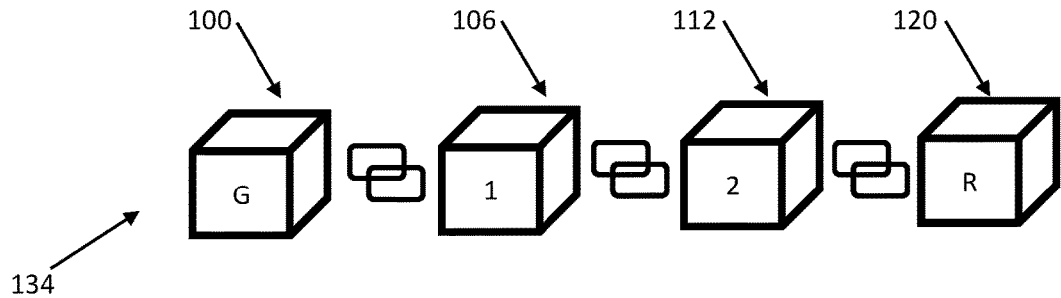

| GENESIS BLOCK 100 | INFORMATION IN BLOCK:<br>*HASH OF CURRENT BLOCK<br>*DATA:<br>- MESSAGE – (SENDER ADDRESS, RECEIVER ADDRESS, MESSAGE BODY)<br>- SENDER DYNAMIC ID GT1 BLOCK WITH TIME T1<br>- NETWORK CLOCK NT1 BLOCK WITH TIME T1 |
|---|---|
| FIRST NODE BLOCK 106 | INFORMATION IN BLOCK:<br>*HASH OF PREVIOUS BLOCK (GENESIS) AND HASH OF CURRENT BLOCK<br>*DATA:<br>- DISTRIBUTED NETWORK NODE 1 DYNAMIC ID 1T2 BLOCK WITH TIME T2<br>- NETWORK CLOCK NT2 BLOCK WITH TIME T2 |
| SECOND NODE BLOCK 112 | INFORMATION IN BLOCK:<br>*HASH OF PREVIOUS BLOCK (FIRST NODE) AND HASH OF CURRENT BLOCK<br>*DATA:<br>- DISTRIBUTED NETWORK NODE 2 DYNAMIC ID 2T3 BLOCK WITH TIME T3<br>- NETWORK CLOCK NT3 BLOCK WITH TIME T3 |
| RECIPIENT BLOCK 120 | INFORMATION IN BLOCK:<br>*HASH OF PREVIOUS BLOCK (SECOND NODE) AND HASH OF CURRENT BLOCK<br>*DATA:<br>- SENDER DYNAMIC ID RT4 BLOCK WITH TIME T4<br>- NETWORK CLOCK NT4 BLOCK WITH TIME T4 |

FIG. 14

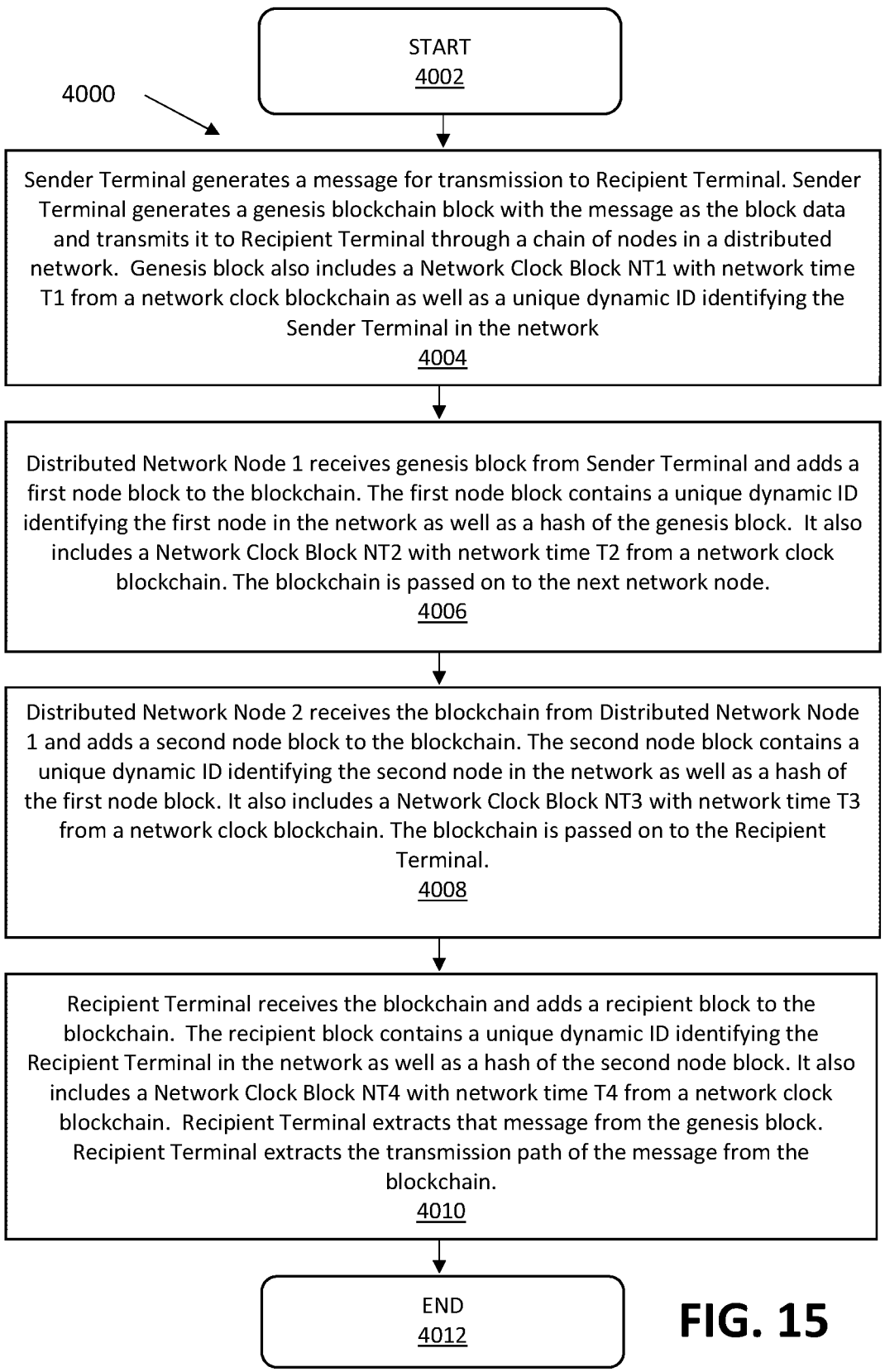

BLOCKCHAIN NETWORK COMMUNICATIONS SYSTEM

BACKGROUND

A blockchain is a continuously growing list of records, called blocks, which are linked and secured using cryptography. Each block typically contains a cryptographic hash of the previous block, a timestamp, and transaction data. By design, a blockchain is inherently resistant to modification of the data. It is an open, distributed ledger that can record transactions between two parties efficiently and in a verifiable and permanent way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority.

Blockchains are secure by design and are an example of a distributed computing system with high *Byzantine* fault tolerance. Decentralized consensus has therefore been achieved with a blockchain. This makes blockchains potentially suitable for the recording of events, medical records, and other records management activities, such as identity management, transaction processing, documenting provenance, food traceability, or voting.

The first work on a cryptographically secured chain of blocks was described in 1991 by Stuart Haber and W. Scott Stornetta. In 1992, Bayer, Haber, and Stornetta incorporated Merkle trees to the design, which improved its efficiency by allowing several documents to be collected into one block. In 2002, David Mazières and Dennis Shasha proposed a network file system with decentralized trust: writers to the file system trust one another but not the network in between; they achieve file system integrity by writing signed commits to a shared, append-only signature chain that captures the root of the file system (which in turn is a Merkle Tree). This system can be viewed as a proto-blockchain in which all authorized clients can always write, whereas, in modern blockchains, a client who solves a cryptographic puzzle can write one block. In 2005, Nick Szabo proposed a blockchain-like system for decentralized property titles and his "bit-gold" payment system that utilized chained proof-of-work and timestamping. However, Szabo's method of double-spending protection was vulnerable to Sybil attacks.

Blockchain was conceptualized in 2008 by Satoshi Nakamoto and implemented in 2009 as a core component of Bitcoin's public transaction ledger. The invention of the blockchain for Bitcoin made it the first digital currency to solve the double spending problem without the need of a trusted authority or central server. The bitcoin design has been the inspiration for other applications.

SUMMARY

The present patent application discloses a distributed network system for communications via messaging based on blockchains. Utilizing blockchains for network messaging allows for various security systems to ensure that messages are not intercepted in a man-in-the-middle attack, or other form of hacking. According to the present invention, an electronic message formed of a blockchain includes a genesis block containing as data an electronic message and identifying information of a sender terminal that generated the electronic message. The blockchain also includes a plurality of router blocks containing identifying information of routers that transmitted the electronic message through a distributed network. The blockchain also includes a recipient block containing identifying information of a recipient terminal to which the electronic message was sent. The genesis block, plurality of router blocks, and recipient block are all linked together in a blockchain through hashes. The sender terminal generates the genesis block when the electronic message is sent to the recipient terminal. The identifying information of the sender terminal may be a static device ID, a dynamic device ID, a cryptographic anchor, or other device hardware information. The routers generate the router blocks when each router respectively receives the electronic message and appends it to the blockchain before forwarding the electronic message to another network node in the distributed network. The identifying information of routers may be a static device ID, a dynamic device ID, a cryptographic anchor, or other device hardware information. The recipient terminal generates the recipient block when the recipient terminal receives the electronic message. The identifying information of the recipient terminal may be a static device ID, a dynamic device ID, a cryptographic anchor, or other device hardware information.

This messaging system may also include a network clock-timing signal distributed to all nodes in the distributed network via individual blocks that form a network clock blockchain. Each block designates a separate time recorded within the block as data. The sender terminal receives the network clock timing signal and incorporates a block of the network clock blockchain as data into the genesis block as a timestamp signifying when the sender terminal generated the genesis block. The routers receive said network clock timing signal and incorporates a block of said network clock blockchain as data into said router blocks as a timestamp signifying when said routers generate said router blocks. The recipient terminal receives the network clock timing signal and incorporates a block of the network clock blockchain as data into the recipient block as a timestamp signifying when the routers generate the router blocks. The identifying information of said sender terminal, the identifying information of routers, and the identifying information of the recipient terminal define a path through the distributed network identifying where the electronic message travelled through the distributed network. The recipient block forms a terminator block to said blockchain.

The present invention also discloses a method for transmitting an electronic message between a sender and a receiver across a distributed network. This method includes generating a genesis block with a sender terminal containing an electronic message as data and a hash of the genesis block. The genesis block is then transmitted to a first router from the sender terminal. A first router block is then generated with the first router that contains a hash of the genesis block and identifying information of the first router as data and a hash of the first router block, thereby forming a message blockchain. Next, the message blockchain is transmitted to a recipient terminal from the router. Then, a recipient block is generated with the recipient terminal containing a hash of the first router block identifying information of the recipient terminal as data and a hash of the recipient block added to the message blockchain. Lastly, the electronic message is extracted from the genesis block at the recipient terminal. The identifying information of the sender terminal may be a static device ID, a dynamic device ID, a cryptographic anchor, or other device hardware information. The identifying information of routers may be a static device ID, a dynamic device ID, a cryptographic anchor, or other device hardware information. The identifying information of the recipient terminal may be a static device ID, a dynamic device ID, a cryptographic anchor, or other device hardware information.

This method may also include the generation of a network clock blockchain that designates network time information where each individual block in the network clock blockchain represents a different time that is recorded in the individual block as data. Then the network clock blockchain is distributed to all nodes in the distributed network one block at a time with the progression of time. One network clock block of the network clock blockchain is incorporated into the genesis block as data as a timestamp. The genesis block is created at a time recorded in the one block of the network clock blockchain. This method may also include incorporating one network clock block of the network clock blockchain into the router block as data as a timestamp. The router block is created at a time recorded in the one block of the network clock blockchain. This method may further include incorporating one network clock block of the network clock blockchain into the recipient block as data as a timestamp. The recipient block is created at a time recorded in the one block of the network clock blockchain. This method may additionally include extracting identifying information of the sender terminal, the first router, and the recipient terminal from the message blockchain using a blockchain software module. Then the identifying information from the message blockchain is compared to stored identifying information for the sender terminal, the first router, and the recipient terminal. An electronic alert message is then generated when any of the identifying information from the message blockchain does not match the stored identifying information.

A message path that the electronic message travelled through the distributed network may be generated from the identifying information of the sender terminal, the first router, and the recipient terminal using a blockchain software module. The message path may be compared to stored topographic information of the distributed network to determine if the message path is a valid path through the distributed network. An electronic alert message may be generated when the message path is an invalid path. Network time information may be extracted from the network clock blocks incorporated as data into the genesis block, the router block, and the recipient block using a blockchain software module. The extracted network time information is then compared to a stored copy of the network clock blockchain. An electronic alert message is generated when the extracted network time information does not match the stored copy of the network clock blockchain. It is then determined whether a gap in time exists from the extracted network time information in the transmission of the electronic message through the distributed network. An electronic alert message is generated when a gap in time exists. A blockchain software module may be used for verifying blockchain network information contained in the message blockchain with respect to stored blockchain network information. An electronic alert message is generated when blockchain network information contained in the message blockchain does not match the stored blockchain network information.

The present invention also discloses a network communications security system for a distributed network. This network includes a blockchain verification server that receives an electronic message blockchain from a recipient terminal. This electronic message blockchain has a genesis block containing as data an electronic message and identifying information of a sender terminal that generated the electronic message. This electronic message blockchain also has a plurality of router blocks containing identifying information of routers that transmitted the electronic message through a distributed network. In addition, this electronic message blockchain has a recipient block containing identifying information of the recipient terminal to which the electronic message was sent. The genesis block, plurality of router blocks and recipient block are linked in a blockchain through hashes. The blockchain verification server extracts the identifying information of the sender terminal, the routers, and the recipient terminal from the electronic message blockchain. The blockchain verification server then compares the identifying information to stored identifying information about the distributed network. The blockchain verification server generates an electronic alert message to the recipient terminal when the identifying information from the electronic message blockchain does not verify with the stored identifying information.

The disclosed network communications security system also includes a blockchain message data module that extracts the electronic message from the data portion of said genesis block. It can also include a blockchain path mapping verification module that takes the identifying information from the electronic message blockchain and generates a map of a path taken by the electronic message blockchain from the sender terminal to the recipient terminal through the distributed network. The blockchain path mapping verification module compares the map of the path taken by the electronic message blockchain to a stored topographic map of the distributed network. The blockchain verification server generates an electronic alert message when the map of the path taken by the electronic message blockchain does not match a valid path through the distributed network. The map of the path taken by the electronic message blockchain does not match a valid path through the distributed network when the map of the path does not result in a contiguous chain of nodes within the distributed network, thereby indicating the electronic message blockchain was subjected to eavesdropping. The network communications security system for a distributed network may also have a blockchain network clock generation module that generates a network clock blockchain that contains network time information as timestamp data. Each block of the network clock blockchain contains a different time as timestamp data. The blockchain verification server distributes the network clock blockchain block by block to all nodes within the distributed network. The electronic message blockchain includes blocks from the network clock blockchain to indicate timing information as to when different nodes of the distributed network handled the electronic message blockchain, thereby functioning as a timestamp. The system may also include a cryptographic anchor module that acquires location information on the blockchain verification server utilizing network topography discovery agents and GPS information along with device hardware information on the blockchain verification server to produce a cryptographic anchor for the blockchain verification server. The network communications security system for a distributed network also has a data storage system in communication with the blockchain verification server that maintains various electronic records. These electronic records include the network clock blockchain, the identifying information of the sender terminal, the routers, and the recipient terminal, as well as stored topographic map of the distributed network. In one embodiment, the identifying information of the sender terminal, the routers, and the recipient terminal are static identities. In another embodiment, the identifying information of the sender terminal, the routers, and the recipient terminal are dynamic identities whose variance are recorded in dynamic identity blockchains for each individual network node. The dynamic identity blockchains are transmitted by each individual network node to the blockchain verification server.

The present invention also discloses a network router. The router has a blockchain message communication module that receives an electronic message blockchain from a sender terminal. The electronic message blockchain has a genesis block containing as data an electronic message and identifying information of a sender terminal that generated the electronic message. The router also has a blockchain ID generation module that generates a router block. The router block includes identifying information about the network router as data. The router block also includes a hash of the genesis block and a hash of said router block. The blockchain ID generation module appends the router block to the genesis block to enlarge the electronic message blockchain. The network router transmits the enlarged electronic message blockchain to another node in a distributed network toward a recipient terminal. The identifying information about the network router is a static hardware identity including a device serial number or device component information in one embodiment. In another embodiment, the identifying information about said network router is a dynamic identity that varies with time. The blockchain ID generation module creates a dynamic ID blockchain that contains the dynamic identity of the network router as data. The blockchain ID generation module transmits the dynamic ID blockchain to a blockchain verification server for storage to use to verify the electronic message blockchain. The blockchain ID generation module incorporates a current block in the dynamic ID blockchain into the electronic message blockchain as data within the router block to function as a timestamp as to when the network router handled the electronic message blockchain. The router may also include a cryptographic anchor module that acquires GPS information about the network router and network topographic information about a location of the network router within the distributed network. The cryptographic anchor module incorporates the GPS information and the network topographic information into the router block as a cryptographic anchor.

Further aspects of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself, however, both as to its structure and operation together with the additional objects and advantages thereof are best understood through the following description of the preferred embodiment of the present invention when read in conjunction with the accompanying drawings, wherein:

FIG. 2 illustrates a diagram of a blockchain created during the transmission of a message from a network sender to a network recipient where each node has a static network ID;

FIG. 6 illustrates a diagram of a blockchain created during the transmission of a message from a network sender to a network recipient where each node has a dynamic network ID;

FIG. 7 illustrates a diagram of a blockchain that captures the dynamic ID information of a network node, where each block in the chain contains a different dynamic network ID number at a different time T;

FIG. 10 illustrates a diagram of a blockchain created during the transmission of a message from a network sender to a network recipient where each node has a static network ID and receives blocks from a master server that contain network timing clock data which together form a network clock blockchain;

FIG. 11 illustrates a diagram of a blockchain that captures the timing data of the network clock, where each block contains data representing a different time T;

FIG. 14 illustrates a diagram of a blockchain created during the transmission of a message from a network sender to a network recipient where each node has a dynamic network ID and receives blocks from a master server that contain network timing clock data which together form a network clock blockchain;

FIG. 15 illustrates a flow chart depicting a process for transmitting a message from a network sender to a network recipient via blockchain blocks where the transmission creates a blockchain where each node has a dynamic ID and receives blocks from a master server that contain network timing clock data which together form a network clock blockchain;

DETAILED DESCRIPTION

While the invention has been shown and described with reference to a particular embodiment thereof, it will be understood to those skilled in the art, that various changes in form and details may be made therein without departing from the spirit and scope of the invention.

Figure 1:
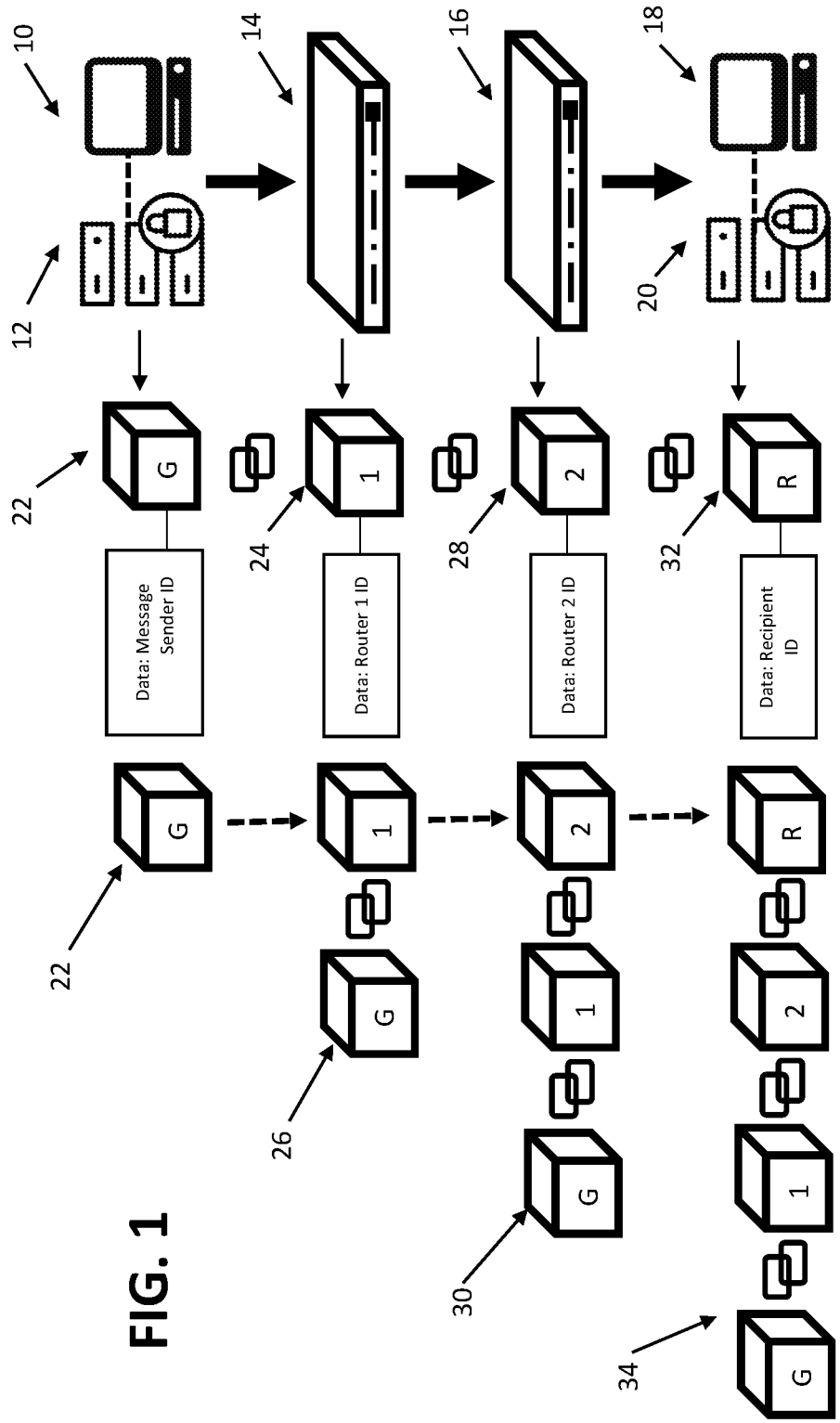
FIG. 1 illustrates a block diagram of an exemplary message transmission via blockchain blocks from a network sender to a network recipient where each device has a static network ID.

The present invention discloses a system, method, and associated hardware for providing electronic communications across a distributed network using blockchain technology. FIG. 1 illustrates a block diagram of an exemplary message transmission via blockchain blocks from a network sender 10/12 to a network recipient 18/20 where each device has a static network ID. Network sender 10/12 includes a secure server 12 attached to a terminal station 10. In this figure, sender terminal 10/12 generates an electronic message that is sent to recipient terminal 18/20 through routers 14 and 16. Recipient terminal 18/20 includes a terminal station 18 and a secure server 20. When terminal 10 generates a message for transmission by secure server 12, secure sever 12 creates a genesis data block 22. The genesis data block 22 includes the electronic message as data. The electronic message may be any form of data, such as a network communication, spreadsheet, text, video, images, audio, code, code update, metadata, and the like. Secure server 12 has identifying information that identifies secure server 12 within the distributed network. This identifying information may be for example a serial number, a device number, hardware information about server 12, or in the form of a cryptographic anchor. This identifying information may be static information that remains time constant, or can be dynamic information that varies with time. Secure server 12 takes this identifying information about server 12 and also includes it as data within genesis block 22. Note terminal 10, routers 14 and 16, and recipient secure server 20 and terminal 18 also have identifying information identical to secure server 12. Terminal 10, routers 14 and 16, and recipient secure server 20 and terminal 18 may have identifying information that for example could be a serial number, a device number, hardware information about server 12, or a cryptographic anchor. This identifying information may be static information that remains time constant, or can be dynamic information that varies with time. The identifying information, be it static or dynamic, for each device 10, 12, 14, 16, 18, or 20 that uniquely identifies that device within the distributed network apart from every other device. The identifying information therefore functions as a fingerprint to show which devices within the distributed network handle the electronic message. The genesis block includes the electronic message as data. The genesis block 22 may also include identifying information about sender terminal 10/12 as a part of its data in addition to the electronic message. This identifying information may include identifying information of both secure server 12 and terminal 10. At this point in the process, genesis block 22 forms a blockchain 22 that consists of a single block. As block 22 is the genesis block, it does not contain a hash of a previous block as there is no previous block. Genesis block "G" 22 does however contain a hash of itself. Secure sever 12 transmits blockchain 22 to router 14. In this example, device 12, 12, 14, 16, 18, and 20 are all a part of a distributed network. While this distributed network is only illustrated having two routers 14 and 16, it is contemplated that the distributed network may have any number of routers. In this exemplary distributed network, only two secure servers 12 and 20 and two terminals 10 and 18 are shown for illustrative purposes for sending and receiving a message. However, it is contemplated that the distributed network may contain any number of secure servers and terminals. In this example, the identifying information of terminal 10 and secure server 12 is static information.

Secure server 12 transmits blockchain 24 formed of genesis block 22 to router 14 for transmission to recipient terminal 18/20. When router 14 receives blockchain 22, router 14 generates router block 24 to append to genesis block 22, thereby enlarging blockchain 22 from one block to two blocks in blockchain 26. Router block 24 includes identifying information on router 14 as data. In this example, the identifying information of router 14 is static information. Router block 24 includes a hash of genesis block 22 as well as a hash of itself. The fact that block 24 includes a hash of block 22 forms a blockchain 26 between blocks 22 and 24. Router 14, having marked the electronic blockchain message 26 with its identifying block 24, forwards electronic message blockchain 26 on to router 16. Like with router 14, router 16 creates a blockchain block, router block 28, to append to blockchain 26, thereby forming electronic message blockchain 30 to identify the fact that router 16 handled electronic message blockchain 30. Router block 28 includes identifying information on router 16 as data. In this example, the identifying information of router 16 is static information. Router block 28 includes a hash of router block 24 as well as a hash of itself. The fact that block 28 includes a hash of block 24 forms a blockchain 30 between blocks 28 and 24 as well as 24 and 22. The inclusion of blocks 24 and 28 identifies the fact that routers 14 and 16 handled electronic blockchain message 30. Router 16 then forwards electronic message blockchain 30 on to recipient terminal 18/20. Recipient terminal 18/20 generates a recipient block 32. Recipient block 32 includes static identifying information about recipient terminal 18/20 as data. Recipient block 32 also includes a hash of router block 28 and a hash of itself. Recipient terminal 18/20 appends block 32 to electronic message blockchain 30 to form electronic message blockchain 34. The fact that block 32 includes a hash of block 28 forms a blockchain 34 between blocks 32 and 28, 28 and 24, and, 24 and 22. Recipient block 32 is a terminating block to blockchain 34. An electronic message blockchain per the present invention begins with identifying information about the sender 10/12 and ends with the receiver 18/20. The use of blockchain blocks 24, 26, 30, and 34 enables the present invention to track which nodes within the distributed network handled electronic message blockchain 34 through blocks 22, 24, 28, and 32. The use of blockchain technology makes it possible to map a specific path that electronic message blockchain 24 travelled through the distributed network. Further, the use of blockchain technology to encode message transmission information on which devices 10, 12, 14, 16, 18, and 20 handled electronic message blockchain makes it difficult for a third party to hack and alter the original electronic message contained as data within genesis block 22, as well as all of the subsequent device identifying information due to the chain of hashes that interlink blocks 22, 24, 28, and 32 into a blockchain.

FIG. 2 illustrates a diagram of an electronic message blockchain 34 created during the transmission of a message from a network sender 10/12 to a network recipient 18/20 where each node in the distributed network has a static network ID. Electronic message blockchain 34 is formed of genesis block 22, router block 24, router block 28, and recipient block 32. Genesis block 22 includes data. This data is an electronic message that has, for example, the sender's address, receiver's address, and a message body and various message attachments. The message can include text, images, video, code, code updates, spreadsheets, biometric-data, metadata, applications, network communication signals, security data, or any other form of electronic data or software. Genesis block 22 also includes a static network ID of the sender node as data. Genesis block 22 also includes a hash of itself. In this example, router 14 is the first node in the network that electronic message blockchain 22 encounters. Thus, router block 24 is also referred to as first node block 24. Router block 24 includes as data the static network ID of router 14. Router 14 is, in this example, the first node of the distributed network. Router block 24 also has a hash of genesis block 22 and of itself. Router block 28 is also referred to as second node block 28 as router 16 forms the second network node that electronic message blockchain 34 encounters within the distributed network. Router block 28 includes a static network ID of router 16, the second node of the distributed network, as data. Router block 28 also includes a hash of router block 24 and a hash of itself. The terminator block of electronic message blockchain 34 is recipient block 32. Recipient block 32 includes as data the static network ID of recipient node 18/20. Recipient block 32 also includes a hash of router block 28 and a hash of itself. The use of blockchain technology helps to protect the integrity of data within electronic message blockchain 34 from tampering and manipulation.

Figure 3:
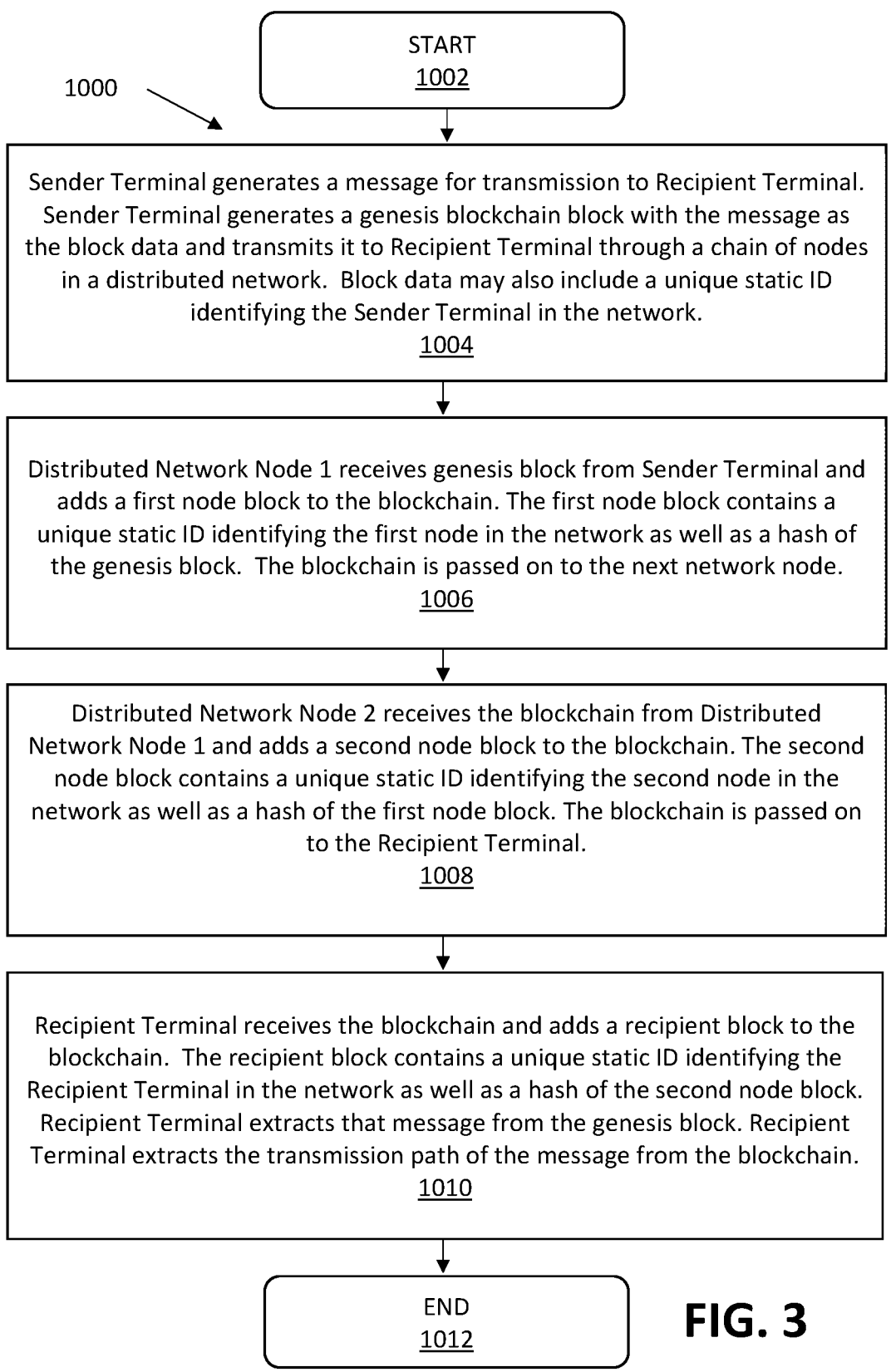
FIG. 3 illustrates a flow chart depicting a process for transmitting a message from a network sender to a network recipient via blockchain blocks where the transmission creates a blockchain where each node has a static ID.

FIG. 3 illustrates a flow chart 1000 depicting a process for transmitting a message from a network sender 10/12 to a network recipient 18/20 via blockchain blocks 22, 24, 28, and 32 where the transmission creates a blockchain 34 where each node 10, 12, 14, 16, 18, and 20 has a static ID. The process begins with START 1002. In step 1004, the sender terminal 10/12 generates an electronic message for transmission to recipient terminal 18/20. Sender terminal 10/12 generates a genesis blockchain block 22 with the electronic message as the block data. The block data also includes a unique static ID that identifies the sender terminal 10/12 within the distributed network. Sender terminal 10/12 transmits blockchain 22 to recipient node 18/20 through network nodes 14 and 16, which are routers. In step 1006, router 14, which is distributed network node one, receives genesis block 22 from sender terminal 10/12 and adds router block 24, also referred to as first node block 24, to block 22 to form blockchain 26. Blockchain 26 is then passed to the next network node, which is router 16. In this example, two routers are shown in between sender 10/12 and receiver 18/20. However, it is contemplated that any number of nodes may exist between sender 10/12 and receiver 18/20. In step 1008, router 16, which is distributed network node two, receives blockchain 26 from router 14 and adds router block 28 to blockchain 26 to form blockchain 30. Once blockchain 30 is formed, router 16 transmits blockchain 30 to recipient terminal 32. In step 1010, recipient terminal 18/20 receives blockchain 30 and generates recipient block 32 that contains a hash of router block 28 and the static network identifying information of recipient terminal 18/20. Recipient terminal 28 appends recipient block 32 to blockchain 30 to form blockchain 34, which is the final form of the electronic message blockchain. The final form of the electronic message blockchain 34 begins with a block from sender terminal 10/12 that include the electronic message as data and ends with a block from recipient terminal 18/20. The final form of the electronic message blockchain 34 also includes blocks 24 and 28 that include information on which nodes, 14 and 16, within the distributed network handled and forwarded electronic message blockchain 34. Recipient block 32 has a hash of router block 28 and a hash of itself. Recipient terminal 18/20 extracts the electronic message that is contained as data within genesis block 22 and provides it to the message recipient user. Recipient terminal 18/20 can also extract a message path that electronic message blockchain 34 took through the distributed network by examining the identifying information of which devices 10, 12, 14, 16, 18, and 20 handled electronic message blockchain 34 and comparing it to stored information of the distributed network topology.

Figure 4:
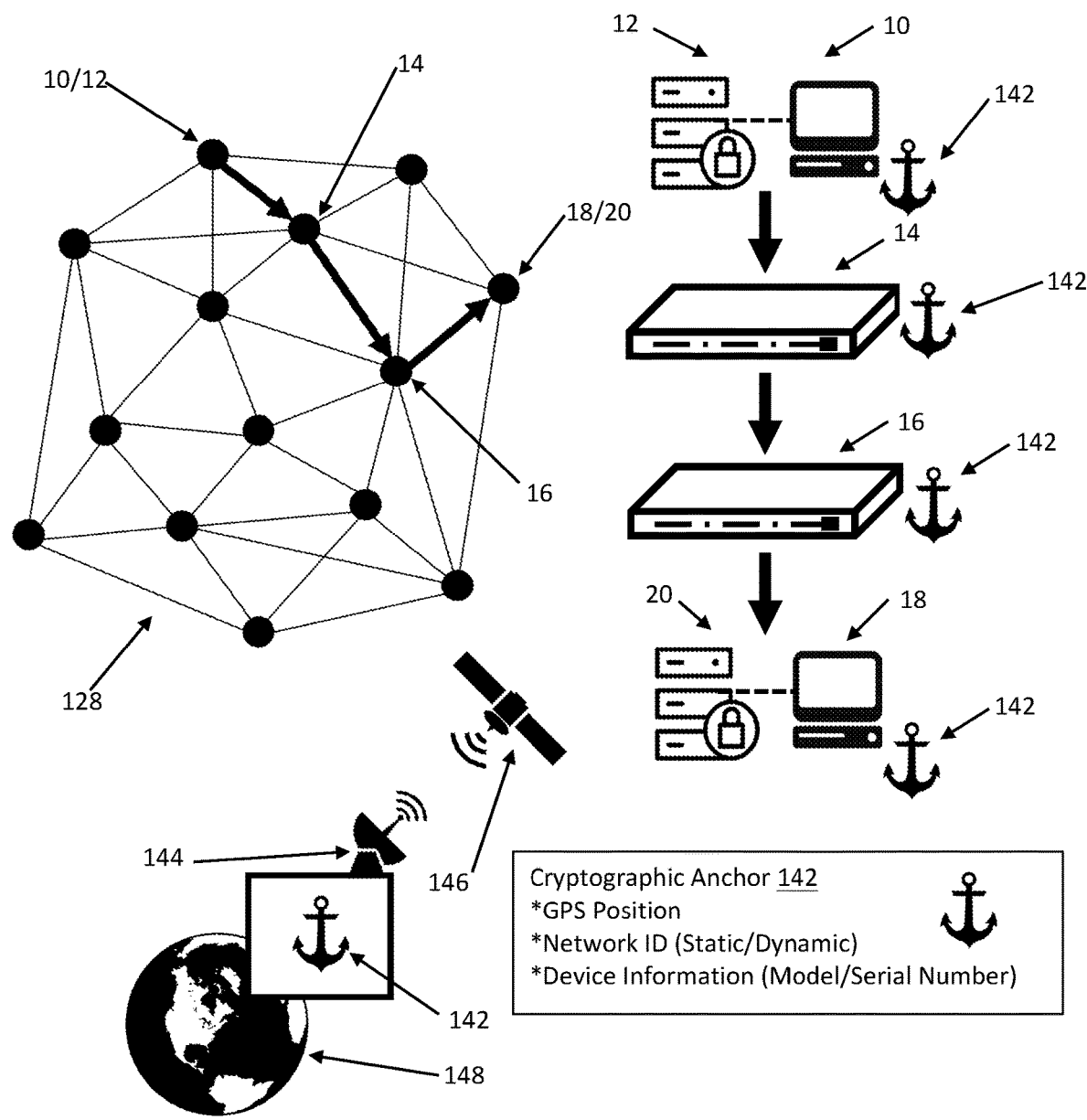
FIG. 4 illustrates a schematic drawing of a distributed network that includes a network sender, network receiver and various router nodes, all of which may include cryptographic anchors for device identification.

FIG. 4 illustrates a schematic drawing of a distributed network 128 that includes a network sender 10/12, network receiver 18/20 and various router nodes 14 and 16, all of which may include cryptographic anchors 142 for device identification. Cryptographic anchors 142 are tamper-resistant digital fingerprints that are linked to the blockchain that aid to verify the authenticity of the identifying device information. Cryptographic anchors 142 may be based upon Global Positioning System (GPS) position information, static or dynamic network ID information, or hardware device information based upon device model information or serial number information. With respect to geographic information on where a device 10, 12, 14, 16, 18, or 20 resides on the Earth 148, a GPS signal receiver 144 acquires a GPS signal from at least four GPS satellites 146 to generate cryptographic anchor 142. Each node of distributed network 128 may have a GPS based cryptographic anchor 142. Cryptographic anchors 142 may be encrypted and are designated by a naval anchor symbol. It is contemplated that every node of distributed network 128, represented by a dot, which includes sender 10/12, receiver 18/20 and routers 14 and 16, will have their own separate cryptographic anchor 142. At right in FIG. 4, sender terminal 10/12 is shown having a cryptographic anchor 142. Routers 14 and 16 are shown having cryptographic anchors 142. Recipient terminal 18 and 20 have cryptographic anchors as well. The path that electronic message blockchain 34 takes from sender 10/12 to recipient 18/20 is shown by block arrows between nodes 10/12 and 14, nodes 14 and 16, and nodes 16 and 18/20. It is possible to map this path that electronic message blockchain 34 takes through distributed network 128 by extracting the identifying information of devices 10, 12, 14, 16, 18, and 20 with cryptographic anchor 142 from the data portion of each individual block 22, 24, 28, and 32 from blockchain 34. The use of blockchain 34 to track the path of the electronic message contained as data within genesis block 22 makes the communication of messages within distributed network 128 more robust against potential hacking. If others hack distributed network 128 and intercept messages by diverting them out of network 128 where they can be read and then reinserted into another node of network 128, blockchain 34 will not contain a contiguous path of nodes through the distributed network 128. This gap in the chain of nodes in the path of electronic message blockchain 34 indicates that the network 128 has been hacked allowing security information technology personnel to take corrective action to stop the malicious attack. Further, if a hacker wanted to disguise the fact that the communication traffic in network 128 was intercepted and diverted by forging identifying information about nodes in network 128, it would force the hacker to recalculate the various blocks in the blockchain to make sure that everything tabulated correctly, which would require significant time and computational power making attacks highly consuming on the attacker's computational resources, thereby deterring attacks.

Figure 5:
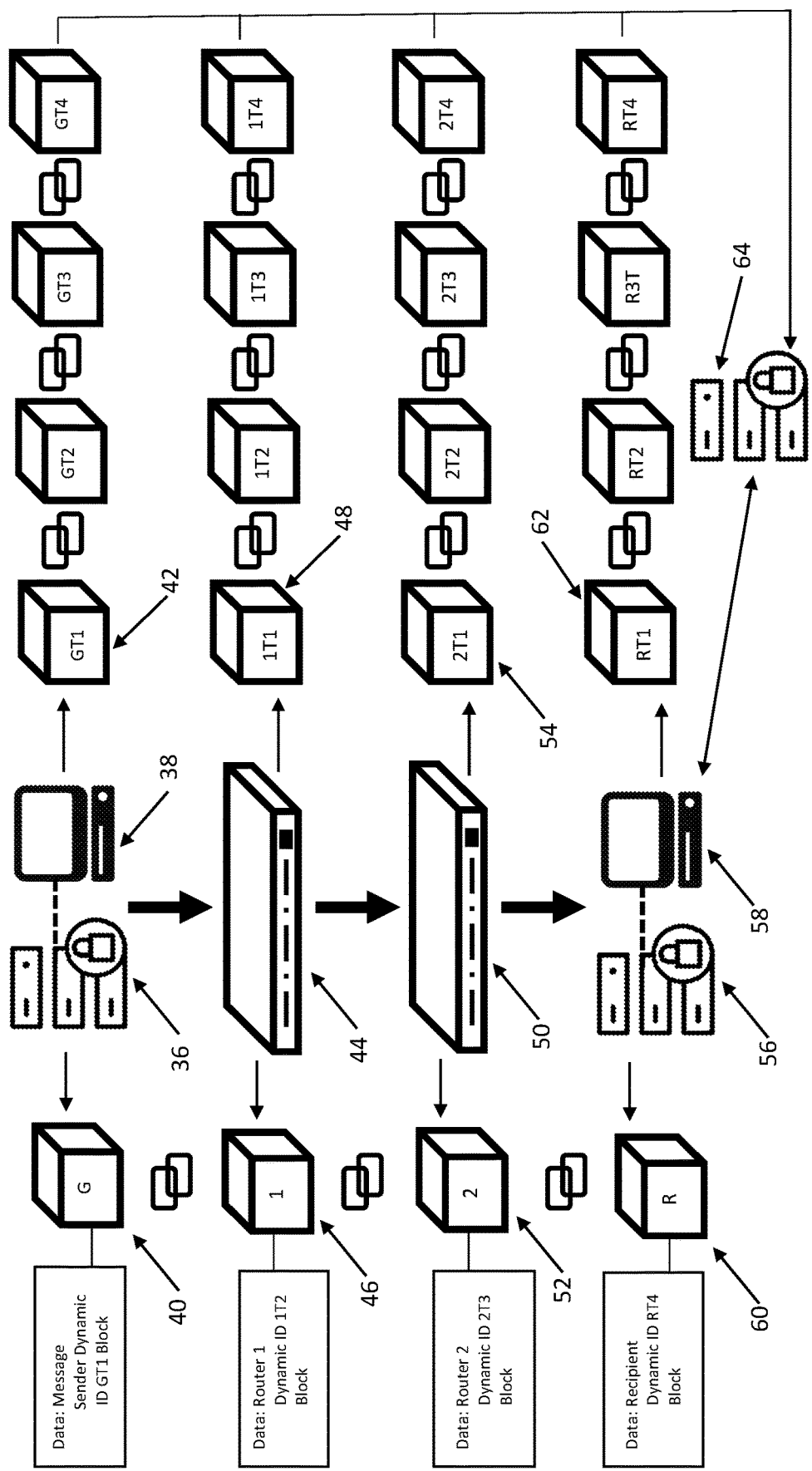
FIG. 5 illustrates a block diagram of an exemplary message transmission via blockchain blocks from a network sender to a network recipient where each device has a dynamic network ID.

FIG. 5 illustrates a block diagram of an exemplary message transmission via blockchain blocks 40, 46, 52, and 60 from a network sender 36/38 to a network recipient 56/58 where each device has a dynamic network ID. Network sender includes a terminal 38 and secure server 36. Network recipient includes a terminal 58 and secure server 56. Network devices 36, 38, 44, 50, 56, and 58 all reside in a distributed network 128. The use of two routers 44 and 50 is exemplary. In this network 128 shown in FIG. 5, all nodes 36, 38, 44, 50, 56, and 58 have dynamic identifying information. Sender terminal 36/38 generates a time varying dynamic ID. Sender terminal 36/38 records this time varying dynamic ID using blockchain 42. Blockchain 42 is formed of blocks that record each individual dynamic ID at a time T when it represents the ID of the device. Here, for exemplary purposes, blockchain 42 has four blocks. However, it is contemplated that blockchain 42 may have any number of blocks. Sender terminal 36/38 generates an electronic message for transmission to recipient terminal 56/58. In order to transmit electronic message to recipient terminal 56/58, sender terminal 36/38 creates genesis block 40, which contains the electronic message as data. Genesis block 40 also contains the dynamic ID of sender terminal 36/38. At time T1, sender terminal has a particular ID that is recorded in block GT1 of blockchain 42. Block GT1 represents Genesis Block Dynamic ID of sender terminal 36/38 at time T1. Similarly, blocks GT2, GT3, and GT4 all contain the dynamic ID of sender terminal 36/38 at times T2, T3 and T4 respectively. Each block GT1, GT2, GT3, and GT4 contain the dynamic identity of sender terminal 36/38 at a particular time as data. Blocks GT1, GT2, GT3, and GT4 are then linked together with hashes to form blockchain 42. Genesis block may contain the dynamic ID of sender terminal 36/38 as data. It is contemplated that genesis block 40 will contain a block of blockchain 42 containing the dynamic ID of sender terminal 36/38. Thus, genesis block 40 is a block in a blockchain 130 that contains a block of another blockchain 42, thereby forming a double blockchain. Device 36/38 has dynamic time varying identity information recorded in blockchain 42. Router 44 has dynamic time varying identity information recorded in blockchain 48. Router 50 has dynamic time varying identity information recorded in blockchain 54. Recipient terminal 56/58 has dynamic time varying identity information recorded in blockchain 62. When sender terminal 36/38 generates genesis block 40 with the electronic message and sender dynamic ID GT1 block as data, sender terminal 36/38 then transmits genesis block to router 44. When router 44 receives genesis block 40, router 44 generates router block 46, which is the first node block. Router block 46 includes the dynamic ID of router 44 at time T2. One method of including the dynamic ID of router 44 at time T2 in router block 46 is by taking block 1T2 from blockchain 48 and including it as data in router block 46. In this example, router 44 is the first node in network 128 that receives block 40. As the first node, the blocks in blockchain 48 are designated first with a number 1. Then the time T is recorded to show at what time the dynamic ID is recorded. So block 1T1 shows the dynamic ID of the first node, router 44, at time T1. Block 1T2 shows the dynamic ID of the first node, router 44, at time T2 and so on. All blocks within blockchain 48 are linked together by hashes. Router block 46 is generated with the dynamic ID as data and it includes a hash of genesis block 40. As genesis block was created at time T1, router block 46 was created at time T2. Thus, router block 46 has dynamic ID block 1T2 to identify router 46. Once router block 46 is generated, it is appended to block 40 as a blockchain through a hash of block 40 being incorporated into block 46. Router 44 then transmits the blockchain formed of blocks 40 and 46 to router 50. Router 50 creates router block 52 at time T3. Thus router 50, which is the second node in network 128, takes a block from blockchain 54, which contains the dynamic ID record of router 50, at time T3 and incorporates that block 2T3 into block 52. The blocks in blockchain 54 are designated with a 2 to signify that router 50 is the second node in network 128. As with blockchains 42 and 48, identifying information blockchain 54 has block 2T1 at time T1, block 2T3 at time T3, and so on. Router block 52 then also contains a hash of block 46 to form a blockchain that includes blocks 40, 46, and 52. Once block 52 is formed and linked to blocks 40 and 46, the combined blockchain is transmitted to recipient terminal 56/58. Recipient terminal 56/58 has a dynamic ID that is recorded in blockchain 62. The blocks in blockchain 52 are designated with an R for recipient terminal and a time T indicating what period in time that block stores the dynamic ID of recipient terminal 56/58 as data. So for example, block RT4 is the recipient block dynamic ID at time T4. Recipient terminal 56/58 generates recipient block 60 and appends it to the blockchain formed of blocks 40, 46, and 52 to form blockchain 130, thus completing the blockchain. Recipient block 60 contains the recipient dynamic ID block RT4 as data as well as a hash of block 52. Recipient terminal 56/58 receives blockchain 130 and extracts the electronic message contained as data in genesis block 40 for the user, thus providing the user with the communication. By using blocks 40, 46, 52, and 60, it is possible to form a path through network 128 that blockchain 130 travelled through network 128, thereby providing a degree of security to the transmission of the electronic message generated by sender terminal 36/38. In this exemplary embodiment, a master server 64 is provided that receives blockchain 42, 48, 54, and 62 where they are stored in a storage device. Master server 64 also receives blockchain 130 formed of blocks 40, 46, 52, and 60 from recipient terminal 56/58. Master server can extract the dynamic ID information contained as data in blocks 40, 46, 52, and 60 and map the path that blockchain 130 took through network 128. Master server 64 can then compare this extracted dynamic ID information to stored dynamic ID information that master server 64 acquired through directly receiving copies of blockchains 42, 48, 54, and 62 from devices 36, 38, 44, 50, 56, and 58 respectively. If the dynamic ID information in blocks 40, 46, 52, and 60 of blockchain 130 matches the stored dynamic ID information acquired directly from devices 36, 38, 44, 50, 56, and 58 through blockchains 42, 48, 54, and 62, then that indicates that the electronic message blockchain 130 was not tampered with. If the dynamic ID information in blockchain 130 does not match the stored dynamic ID information in server 64, then that indicates that the electronic message blockchain 130 was tampered with. Master server 64 receives dynamic ID information from two sources. Master server 64 receives dynamic ID information directly from devices 36, 38, 44, 50, 56, and 58 through blockchains 42, 48, 54, and 62. However, it also has individual blocks of blockchain 42, 48, 54, and 62 stored within electronic message blockchain 130. The comparison of these two pairs of dynamic ID information yields information on whether blockchain 130 was hacked, intercepted, or tampered with in any way. It is contemplated that the usage of time varying dynamic IDs are harder to hack and replicate than the static IDs of FIG. 1.

FIG. 6 illustrates a diagram of a blockchain 130 created during the transmission of a message from a network sender 36/38 to a network recipient 56/58 where each node has a dynamic network ID. Blockchain 130 includes genesis block 40, router block 46, router block 52, and recipient block 60. Genesis block 40 includes an electronic message as data as well as the sender dynamic ID GT1 block of blockchain 42. Genesis block 40 is linked to first node block 46, which is created by the first router 44, also referred to as router block 46. Router block 46 includes the 1T2 block from blockchain 48, which contains the dynamic ID of router 44 at time T2 as data. Router block 46 also includes a hash of genesis block 40 as well as a hash of itself. Second node block 52 is created by router 50 and is also referred to as router block 52. Router block 52 includes block 2T3 from blockchain 54 as data, which designates the dynamic ID of router 50 at time T3. Router block 52 also contains a hash of router block 46 and a hash of itself. Recipient block 60 includes block RT4 as data, which is the dynamic ID of recipient terminal 56/58 at time T4 as recorded in blockchain 62. Recipient block also has a hash of router block 52 and a hash of itself. As blockchain 130 includes blockchain blocks from separate timing blockchains 42, 48, 54, and 62, blockchain 134 is referred to as a double helical blockchain.

FIG. 7 illustrates a diagram of blockchain 42, 48, 54, and 62 that captures the dynamic ID information of a network node 36, 38, 44, 50, 56, and 58, where each block in the chain contains a different dynamic network ID number at a different time T. Block 132 is designated as XT1, representing generic node X at time T1. XT1 could be block GT1 from blockchain 42, 1T1 from blockchain 48, 2T1 from blockchain 54, or block RT1 from blockchain 62. Block 134 is designated as XT2, representing generic node X at time T2. Block 136 is designated as XT3, representing generic node X at time T3. Block 138 is designated as XT4, representing generic node X at time T4. Block XT1 132 has as data the dynamic network ID of node X at time T1. Block XT1 132 also includes a hash of itself, but does not include a hash of a previous block as it is the first block in the blockchain. Block XT2 134 has as data the dynamic network ID of node X at time T2. Block XT2 134 also includes a hash of block 132 and a hash of itself. Block XT3 136 has as data the dynamic network ID of node X at time T3. Block XT3 136 also includes a hash of block 134 and a hash of itself. Block XT4 138 has as data the dynamic network ID of node X at time T4. Block XT4 138 also includes a hash of block 136 and a hash of itself.

Figure 8:
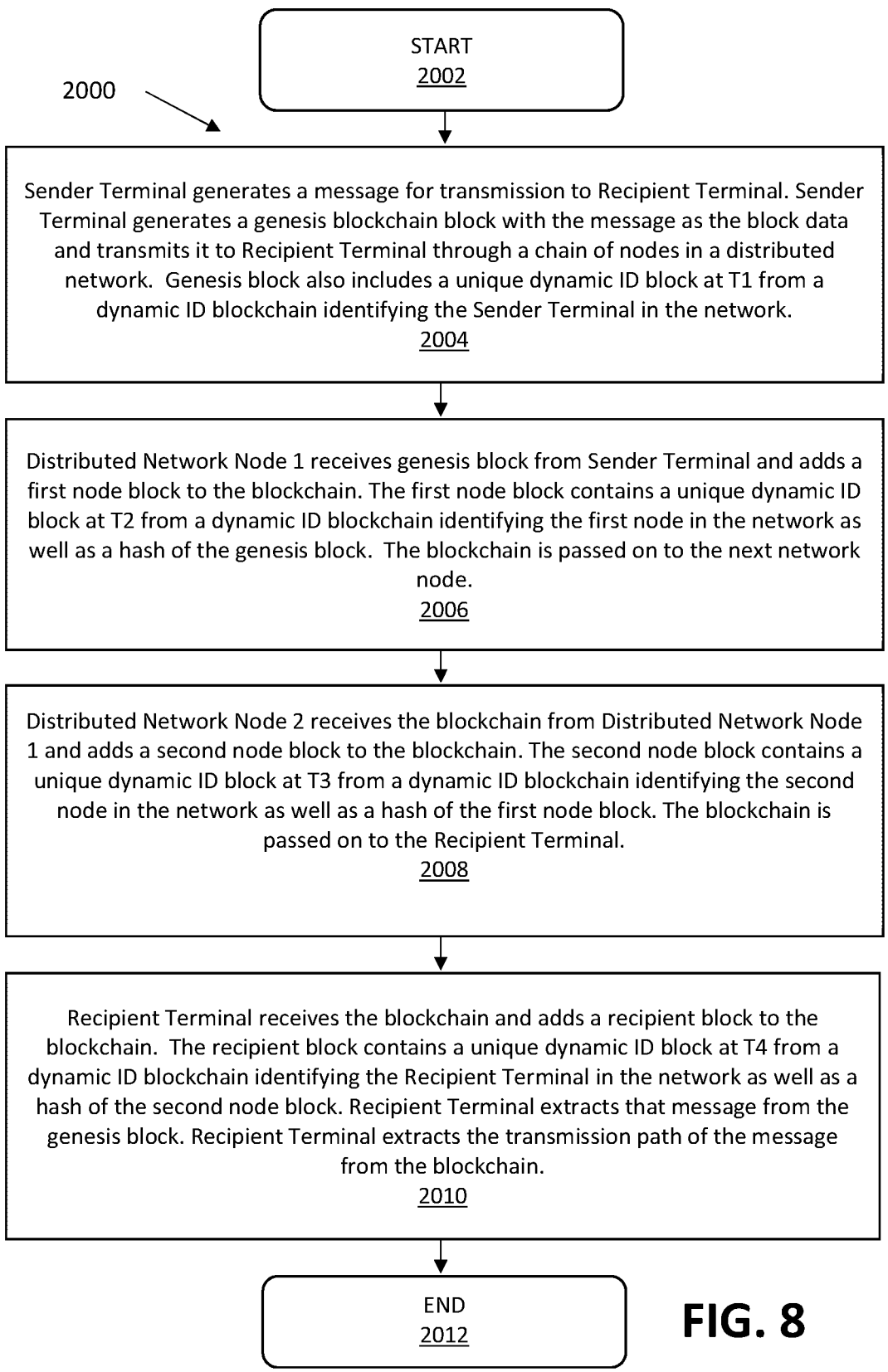
FIG. 8 illustrates a flow chart depicting a process for transmitting a message from a network sender to a network recipient via blockchain blocks where the transmission creates a blockchain where each node has a dynamic ID.

FIG. 8 illustrates a flow chart 2000 depicting a process for transmitting a message from a network sender 36/38 to a network recipient 56/58 via blockchain blocks 40, 46, 52, and 60 where the transmission creates a blockchain 130 where each node has a dynamic ID. The process begins with START 2002. In step 2004, sender terminal 36/37 generates an electronic message for transmission to recipient terminal 56/58. Sender terminal 36/38 generates a genesis block 40 with the electronic message as data. Genesis block 40 also includes a unique dynamic ID of sender terminal 36/38 at time T1 in the form of a block from blockchain 42 at time T1 containing the unique dynamic ID at time T1. Genesis block 40 also includes a hash of itself. Sender terminal 36/38 transmits genesis block 40 to router 44. In step 2006, distributed network node one, which is router 44, receives genesis block 40 and adds router block 46 to it to form a blockchain. Router block 46 contains the dynamic ID of router 44 at time T2 from blockchain 48 in the form of an entire block 1T2. Router block 46 also includes a hash of genesis block 40 and a hash of itself. The blockchain formed of blocks 40 and 46 is then forwarded by router 44 to router 50, which is distributed network node two. In step 2008, router 50 receives the blockchain formed of blocks 40 and 46 and adds block 52, the second node block, to it to form a larger blockchain that contains the transmission history of the electronic blockchain message up to that point. Router block 52 contains the dynamic ID of router 50 at time T3 in the form of block 2T3 from blockchain 54. Router block 52 also includes a hash of router block 46 and a hash of itself. The blockchain formed of blocks 40, 46, and 52 is then forwarded onto recipient node 56/58. In step 2010, recipient terminal 56/58 receives the blockchain formed of blocks 40, 46, and 52 and adds block 60 to it. Block 60 includes the dynamic network ID of recipient terminal 56/58 at time T4 in the form of block RT4 from blockchain 62. Block 60 includes a hash of block 52 and a hash of itself. Recipient terminal 56/58 extracts the electronic message from genesis block 40 to provide it to the user at recipient terminal 56/58. Recipient terminal 56/58 and master server 64 also extract the path of electronic message blockchain 130 from blocks GT1, 1T2, 2T3, and RT4 contained in blocks 40, 46, 52, and 60. By recreating the path that blockchain 130 travelled through network 128, master server 64 can determine whether blockchain 130 was intercepted or hacked. The process ENDS with step 2012.

Figure 9:
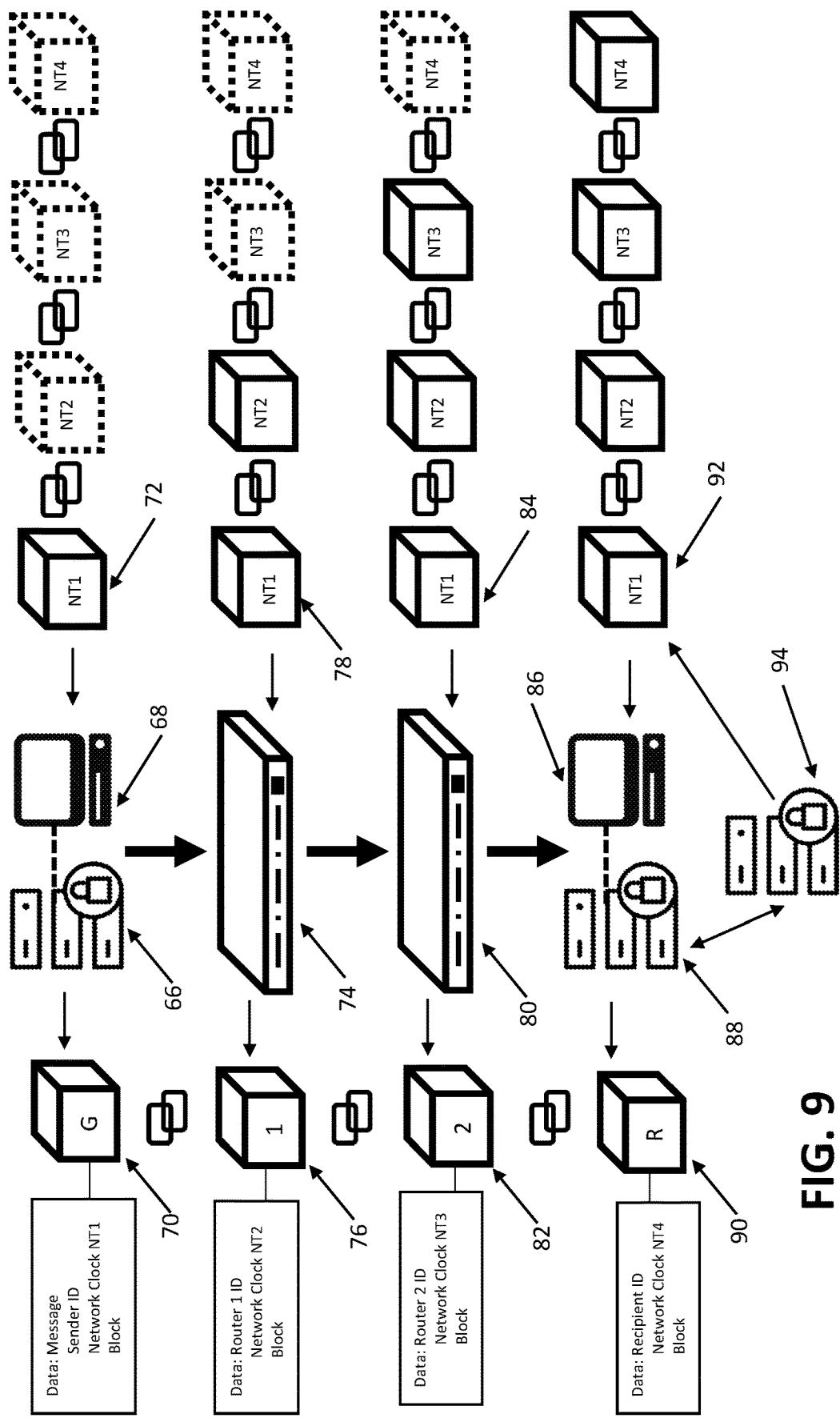
FIG. 9 illustrates a block diagram of an exemplary message transmission via blockchain blocks from a network sender to a network recipient where each device has a static network ID and each node in the network receives blocks from a master server that contain network timing clock data which together form a network clock blockchain.

FIG. 9 illustrates a block diagram of an exemplary message transmission via blockchain blocks 70, 76, 82, and 90 from a network sender 66/68 to a network recipient 86/88 where each device has a static network ID and each node in the network receives blocks from a master server 94 that contain network timing clock data which together form a network clock blockchain 92. Sender terminal includes a secure server 66 and terminal 68. Recipient terminal includes secure server 88 and terminal 86. Master server 94 is a part of distributed network 128. Master server 94 generates a network clock signal that is recorded in a network clock blockchain. Network clock blockchain 92 records a time T along with a dynamic ID code that varies with time T. Thus, each block in blockchain 92 records a different time each having a different dynamic ID code. Blockchain 92 is distributed to all nodes in distributed network 128. As time progresses, master server 94 generates a new block in blockchain 92 and distributes it to every node in distributed network 128. At time T1, master server generates network clock block NT1, where the N stands for Network Clock and the time is at time T1. At time T1, sender terminal 66/68 generates genesis block 70. Genesis block 70 includes the electronic message generated by sender terminal 66/68 as data. Genesis block 70 also includes a static ID of the sender terminal 66/68 as data. Genesis block 70 also includes network clock block NT1 as data to indicate that genesis block 70 was created in network 128 at time T1.

Note that at time T1, each node in network 128 has received block NT1 of blockchain 92 only. Blockchain 72 is formed of just the first block of blockchain 92 at time T1. Future blocks NT2, NT3 and NT4 representing times T2, T3, and T4 have not been created yet as at time T1, those blocks lay in the future. Thus, in blockchain 72, the only block that exists at time T1 is block NT1, which is shown in solid line. Future blocks NT2, NT3, and NT4 are shown in dashed line. Genesis block 70 includes a hash of itself. Once genesis block 70 is created, sender terminal 66/68 forwards genesis block 70 to router 74. Upon receiving genesis block 70, router 74 creates router block 76 at time T2. At time T2, router 74 has received network clock blocks NT1 and NT2 that form blockchain 78, which is a subset of blockchain 92. All other nodes in network 128 have also received blocks NT1 and NT2 at time T2. Future blocks NT3 and NT4 are shown in dashed lines, as they have not been created yet at time T2. Blocks NT1 and NT2 that exist at time T2 are shown in solid line. At time T2, router 74 incorporates the static ID of router 74 and block NT2 into router block 76 as data. Block NT2 functions as a timestamp to identify when router 74 handled block 76. Block 76 includes a hash of genesis block 70 and a hash of itself. Router 74 then forms the blockchain formed of blocks 70 and 76 to router 80. Router 80 then creates router block 82 at time T3. At time T3, router 80 has received network clock blocks NT1, NT2, and NT3, as have all other network nodes. Network clock blocks NT1, NT2, and NT3 form blockchain 84. As network clock blocks NT1, NT2, and NT3 exist at time T3, those blocks are shown in solid line. Future block NT4, which does not exist at time T3, is shown in dashed line. At time T3, router 80 creates router block 82. Router block 82 includes the static ID of router 80 as data. Router block 80 also includes network clock block NT3 as data to function as a timestamp as to when router 80 handled router block 82. Router block 82 includes a hash of router block 76 and a hash of itself. Router 80 then transmits the blockchain formed of blocks 70, 76, and 82 to recipient terminal 86/88. Recipient terminal 86/88 generates recipient block 90 and appends it to block 82 to form a blockchain that includes blocks 70, 76, 82, and 90 at time T4. At time T4, recipient terminal has received network clock blocks NT1, NT2, NT3, and NT4 as have all other network nodes in network 128. Recipient block 90 includes the static ID of recipient terminal 86/88 as data. Recipient block 90 also includes network clock block NT4 as data to identify that recipient terminal 86/88 created block 90 at time T4. Recipient terminal 86/88 then extracts the electronic message contained within genesis block 70 and provides it to the user. Master server 94 then extracts the static identifying information of each network node from blocks 70, 76, 82, and 90, which form blockchain 132, to determine which nodes within network 128 handled the electronic message blockchain 132. Master server 94 also stores a record of all of the static identifying information of all of the nodes in network 128. Master server can therefore recreate the path of electronic message blockchain 132 through network 128 and compare it to stored network topography. If electronic message blockchain 132 followed a valid contiguous path through network 128, then that indicates that blockchain 132 was not intercepted, hacked, or otherwise tampered with. However, if blockchain 132 did not follow a valid contiguous path through network 128 that is an indication that blockchain 132 was intercepted, hacked, or otherwise tampered with. Master server 94 can also extract network clock timing information from blocks 70, 76, 82, and 90 with network clock blocks NT1, NT2, NT3, and NT4. If electronic message blockchain 132 passed through network 128 within a valid time period where nodes 66/68, 74, 80, and 86/88 handled blockchain 132 sequentially in valid time increments, then that indicates that blockchain 132 was transmitted successfully without being intercepted, hacked, or otherwise tampered with. However, if the timing information is not sequential, or there are significant delays, then that is an indication that blockchain 132 was intercepted, hacked, or otherwise tampered with.

FIG. 10 illustrates a diagram of a blockchain 132 created during the transmission of a message from a network sender 66/68 to a network recipient 86/88 where each node has a static network ID and receives blocks NT1, NT2, NT3, and NT4 from a master server 94 that contain network timing clock data which together form a network clock blockchain 92. Blockchain 132 includes genesis block 70, router block 76, router block 82, and recipient block 90. Router block 76 is also called first node block 76, being the first node in network 128 that handled blockchain 132. Router block 82 is also called second node block 82, as router 82 is the second node in network 128 that handled blockchain 132. Genesis block 70 includes an electronic message as data. Genesis block 70 also includes a static network ID of sender node 66/68. As genesis block 70 was created at time T1, it includes network clock block NT1 as data. Genesis block 70 includes a hash of itself, but does not include a hash of an earlier block as it is the first block. Router block 76, also referred to as first node block 76, includes as data the static network ID of distributed network node one, which is router 74. Router block 76 also includes as data network clock block NT2 storing time T2 as data as router block 76 was created by node 74 at time T2. Router block 76 also includes a hash of genesis block 70 and a hash of itself. Second node block 82, also referred to as router block 82, includes as data the static network ID of router 80, which is also referred to as distributed network node two. Router block 82 also includes as data network clock block NT3 storing time T3 as data as router block 82 was created by node 80 at time T3. Router block 82 also includes a hash of router block 76 and a hash of itself. Recipient block 90 includes as data the static network ID of recipient node 86/88. Recipient block 90 also includes as data network clock block NT4 that contains time T4 as recipient block 90 was created by recipient node 86/88 at time T4. Recipient block 90 also includes a hash of block 82 and a hash of itself. Recipient block 90 forms the end of block chain 132. Together, all of the static ID information in blockchain 132 allows master server 94 to reconstruct the path that electronic message blockchain 132 followed through distributed network 128 while going from the sender 66/68 to recipient 86/88. Further, the timing information stored in the network clock blockchain 92 allows master server 94 to recreate the timing and speed at which electronic message blockchain 132 passed from sender 66/68 to recipient 86/88 through distributed network 128. Together, this position information and timing information in blockchain 132 allows master server 94 to determine if electronic message blockchain 132 was tampered with, hacked, or intercepted by comparing it to stored network topographic information and stored network clock blockchain 92. As blockchain 132 includes blockchain blocks from timing blockchains 92, blockchain 132 is referred to as a double helical blockchain.

FIG. 11 illustrates a diagram of a network clock blockchain 92 produced by master server 94 that captures the timing data of the network clock, where each block 134, 136, 138, and 140 contains data representing a different time T. Network clock blockchain 92 functions as the pulse of distributed network 128 as master server 94 distributes it to all network nodes. Block NT1 134 records time data for time T1. Block NT2 136 records time data for time T2. Block NT3 records time data for time T3. Block NT4 records time data for time T4. The use of four blocks in blockchain 92 is merely exemplary. It is contemplated that blockchain 92 may include any number of blocks. Each block is used by any of the nodes in network 128 as a timestamp to indicate when a node creates a block for an electronic message blockchain. Block NT1 134 includes a hash of itself as it is the first block in the blockchain. Block NT2 136 includes a hash of block 134 and a hash of itself. Block NT3 138 includes a hash of block NT2 and a hash of itself. Block NT4 140 includes a hash of block 138 and a hash of itself.

Figure 12:
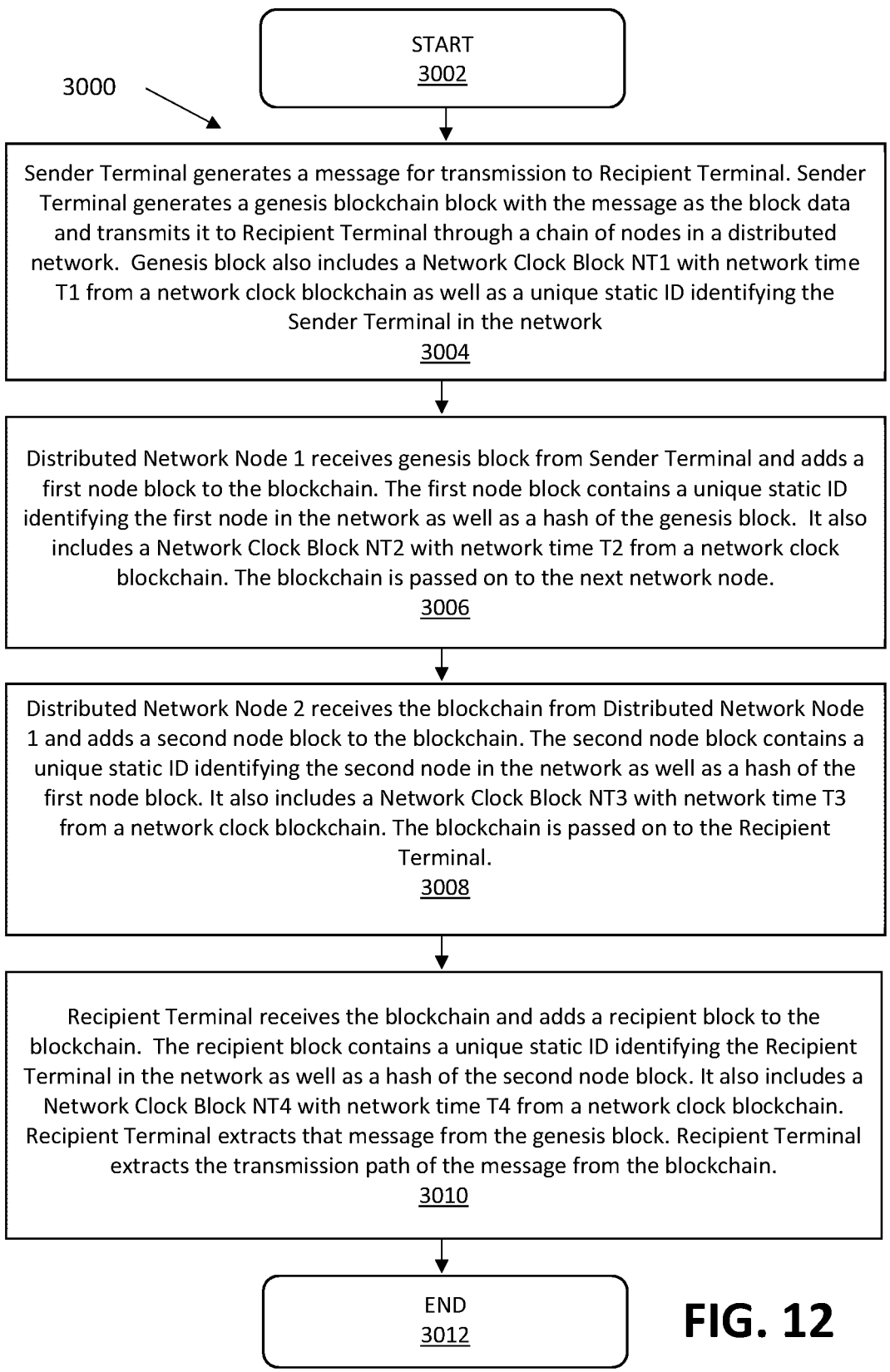
FIG. 12 illustrates a flow chart depicting a process for transmitting a message from a network sender to a network recipient via blockchain blocks where the transmission creates a blockchain where each node has a static ID and receives blocks from a master server that contain network timing clock data which together form a network clock blockchain.

FIG. 12 illustrates a flow chart 3000 depicting a process for transmitting a message from a network sender 66/68 to a network recipient 86/88 via blockchain blocks 70, 76, 82 and 90 where the transmission creates a blockchain 132 where each node has a static ID and receives blocks from a master server 94 that contain network timing clock data which together form a network clock blockchain 92. The process begins with START 3002. In step 3004, sender terminal 66/68 generates an electronic message for transmission to recipient 86/88 through distributed network 128. In order to transmit the electronic message, sender terminal 66/68 generates genesis block 70 that includes the electronic message as data as well as a hash of itself. Further, genesis block 70 includes network clock block NT1 from network clock blockchain 92 as genesis block 70 was created by sender terminal 66/68 at time T1. Further, genesis block 70 includes a unique static ID of sender terminal 66/68 that identifies sender terminal 66/68 in network 128. Once genesis block 70 is created, sender terminal 66/68 transmits genesis block to first network node one, which is router 74. In step 3006, distributed network node one, which is router 74, receives genesis block 70. Router 74 then generates first node block 76, which is also called router block 76. Router block 76 contains the static network ID of router 74 as data. Router block 76 also contains network clock block NT2 as data as router 74 created router block 76 at time T2. The inclusion of network clock block NT2 creates a timestamp indicating when router 74 handled the electronic message blockchain 132. Router block 76 also includes a hash of genesis block 70 and a hash of itself. Once created, router 74 forwards the blockchain formed of blocks 70 and 76 and sends them to router 80, which is also referred to as distributed network node two. In step 3008, router 80 receives the electronic message blockchain formed of blocks 70 and 76. Router 80 then creates router block 82 at time T3. Router block 82 includes the static ID of router 80 as data. As router block 82 is created at time T3, network clock block NT3 is included as data to record that time within router block 82. Router block 82 also includes a hash of block 76 and a hash of itself. Router 80 then forwards the blockchain formed of blocks 70, 76 and 82 to recipient terminal 86/88. In step 3010, recipient terminal 86/88 receives the electronic message blockchain formed of blocks 70, 76 and 82. Recipient terminal 86/88 then forms recipient block 90 at time T4. Recipient block 90 includes the unique network ID of recipient node 86/88 as data. As recipient block 90 was created at time T4, recipient block 90 also includes network clock block NT4 as data to record the time T4 that recipient block 90 was created. Recipient terminal 86/88 then extracts the electronic message from genesis block 70. Master terminal 94, together with recipient terminal 86/88, can then extract the path that electronic message blockchain 132 followed through network 128 between the sender 66/68 and receiver 86/88. Master terminal 94 can compare this extracted path information to stored topographic network information of network 128 to determine if electronic message blockchain 132 followed a valid path through the network or not, thereby indicating whether blockchain 132 was hacked, tampered with, or intercepted. Master terminal 94 can also extract timing information from electronic message blockchain 132 that is recorded in network clock blocks NT1, NT2, NT3, and NT4 within blocks 70, 76, 82, and 90. This timing information can indicate whether electronic message blockchain 132 was transmitted through network 128 within expected speed parameters. Transmitting blockchain 132 under expected speed parameters would indicate that it was not intercepted, hacked, or tampered with. If blockchain 132 was transmitted outside of the expected speed parameters, that is an indication blockchain 132 was intercepted, hacked, or tampered with.

Figure 13:
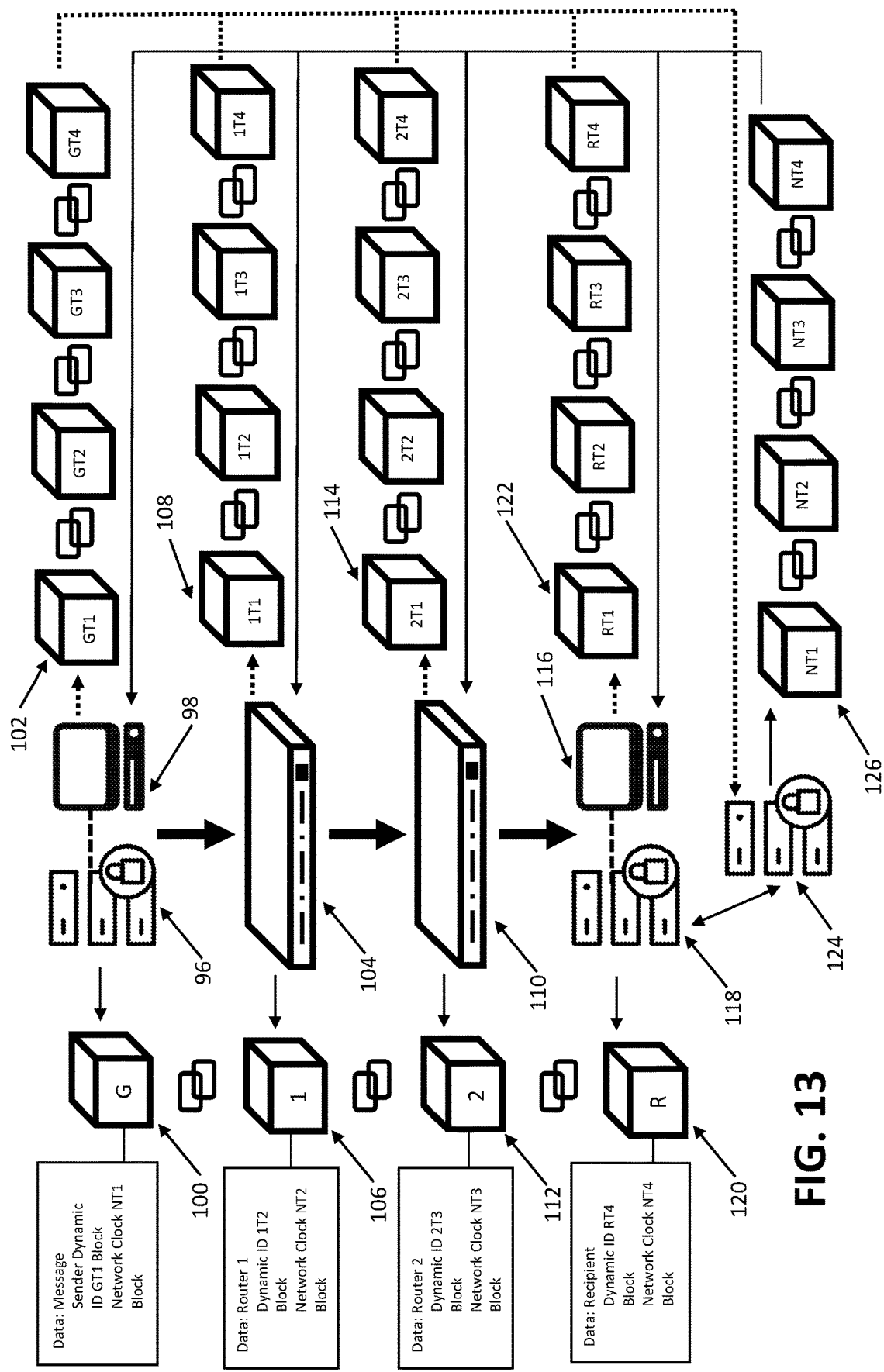
FIG. 13 illustrates a block diagram of an exemplary message transmission via blockchain blocks from a network sender to a network recipient where each device has a dynamic network ID and receives blocks from a master server that contain network timing clock data which together form a network clock blockchain.

FIG. 13 illustrates a block diagram of an exemplary message transmission via blockchain blocks 100, 106, 112, and 120 from a network sender 96/98 to a network recipient 116/118 where each device has a dynamic network ID and receives blocks from a master server 124 that contain network timing clock data which together form a network clock blockchain 126. Blocks 100, 106, 112, and 120 form an electronic message blockchain 134 shown in FIG. 14. Nodes 96, 98, 104, 110, 116, 118, and 124 are all within distributed network 128. Sender terminal 96/98 is formed of terminal station 98 and secure server 96. Recipient terminal 116/118 is formed of a terminal station 116 and secure server 118. Each node 96/98, 104, 110, and 116/118 produces a dynamic time varying network ID that is recorded in blockchains 102, 108, 114, and 122 respectively. Master server 124 produces network clock blockchain 126. Master server stores a copy of blockchain 126 as it transmits it out block by block to all nodes in network 128. All nodes in network 128 produce dynamic ID blockchains like nodes 96/98, 104, 110 and 116/118. Nodes 96/98, 104, 110, and 116/118 send dynamic ID blockchains 102, 108, 114, and 122 to master server 124 for storage and later use in verifying the security of electronic message blockchain 134. Sender node 96/98 generates genesis block 100 at time T1. Genesis block 100 includes as data the electronic message created by sender node 96/98. As genesis block 100 was created at time T1, genesis block 100 includes dynamic network ID blockchain block GT1 to identify that it was created by sender 96/98 at time T1. Further, genesis block 100 also includes network clock blockchain 126 block NT1 to identify the network time at which it was created, which is time T1. Genesis block 100 also includes a hash of itself. Sender node 96/98 then transmits genesis block 100 to router 104. When router 104 receives genesis block 100, it creates router block 106 at time T2. Router block 106 therefore includes dynamic ID blockchain block 1T2 to identify router 104 at time T2. Router block 106 also includes network clock blockchain block NT2 to function as an additional timestamp to identify when block 106 was created by router 104. Router block 106 also includes a hash of block 100 and a hash of itself. Router 104 then transmits the blockchain formed of blocks 100 and 106 to router 110. When router 110 receives the blockchain formed of blocks 100 and 106, router 110 then creates router block 112 at time T3. Router block 112 therefore includes dynamic ID blockchain block 2T3 to identify router 110 at time T3. Router block 112 also includes network clock blockchain block NT3 to function as an additional timestamp to identify when block 112 was created by router 110. Router block 112 also includes a hash of block 106 and a hash of itself. Router 110 then transmits the blockchain formed of blocks 100, 106, and 112 to recipient terminal 116/118. Recipient terminal 116/118 generates recipient block 120 at time T4 when it receives the blockchain formed of blocks 100, 106 and 112. Recipient block 120 includes dynamic ID blockchain block RT4 to identify recipient block 120 at time T4. Recipient block 120 also includes network clock blockchain block NT4 to function as an additional timestamp to identify when block 120 was created by recipient node 116/118. Recipient block 120 also includes a hash of block 112 and a hash of itself, thereby forming electronic message blockchain 134. Recipient terminal 116/118 then extracts the electronic message from genesis block 96/98 for the recipient. Master terminal 124, together with recipient terminal 116/118, can then extract the path that electronic message blockchain 134 followed through network 128 between the sender 96/98 and receiver 116/118. Master terminal 124 can compare this extracted path information to stored topographic network information of network 128 to determine if electronic message blockchain 134 followed a valid path through the network or not, thereby indicating whether blockchain 134 was hacked, tampered with, or intercepted. Master terminal 124 can also extract timing information from electronic message blockchain 134 that is recorded in network clock blocks NT1, NT2, NT3, and NT4 within blocks 100, 106, 112, and 120. This timing information can indicate whether electronic message blockchain 134 was transmitted through network 128 within expected speed parameters. Transmitting blockchain 134 within expected speed parameters would indicate that it was not intercepted, hacked, or tampered with. For example if the speed falls below a minimum data rate, that could indicate that the message communication is being hacked or intercepted. If blockchain 134 was transmitted outside of the expected speed parameters that is an indication that blockchain 134 was intercepted, hacked, or tampered with.

FIG. 14 illustrates a diagram of a blockchain 134 created during the transmission of a message from a network sender 96/98 to a network recipient 116/118 where each node has a dynamic network ID and receives blocks from a master server 124 that contain network timing clock data which together form a network clock blockchain 126. Blockchain 134 includes genesis block 100, router blocks 106 and 112, and recipient block 120. Genesis block 100 includes as data an electronic message generated by a user through sender terminal 98. Genesis block 100 also includes as data dynamic identifying information of sender terminal 96/98 in the form sender dynamic ID block GT1 with dynamic ID information from time T1 from blockchain 102. Genesis block 100 also includes as data network clock blockchain 126 block NT1 as data. Genesis block has a hash of itself, but not hash of an earlier block because it is the first block in blockchain 134. First node block 106, also referred to as router block 106, has as data the dynamic ID of distributed network node one, which is router 104, at time T2. The dynamic ID of distributed network node one, which is router 104, at time T2 is block 1T2 from blockchain 108. In addition, first node block 106 includes network clock block NT2 as data from blockchain 126. Router block 106 includes a hash of genesis block 100 and a hash of itself. Second node block 112, also referred to as router block 112, includes as data the dynamic ID of distributed network node two, which is router 110, at time T3. The dynamic ID of distributed network node two, which is router 110, at time T3 is block 2T3 from blockchain 114. In addition, second node block 112 includes network clock block NT3 as data from blockchain 126. Router block 112 includes a hash of router block 106 and a hash of itself. Recipient block 120 includes as data the dynamic identifying information of recipient terminal 116/118 in the form sender dynamic ID block GT4 with dynamic ID information from time T4 from blockchain 122. Recipient block 120 also includes as data network clock block NT4 as data from blockchain 126. Recipient block 120 also has a hash of block 112 and a hash of itself.

FIG. 15 illustrates a flow chart 4000 depicting a process for transmitting a message from a network sender 96/98 to a network recipient 116/118 via blockchain blocks 100, 106, 112, 120. This transmission creates a blockchain 134 where each node has a dynamic ID and receives blocks from network clock blockchain 126. Blockchain 126 is produced by master server 124, which contains network timing clock data. In this embodiment, each node in network 128 has a dynamic ID captured by blockchains 102, 108, 114, and 112 and receives blocks from a master server 94 that contain network timing clock data which together form a network clock blockchain 126. The process begins with START 4002. In step 4004, sender terminal 96/98 generates an electronic message for transmission to recipient 116/118 through distributed network 128. In order to transmit the electronic message, sender terminal 96/98 generates genesis block 100 that includes the electronic message as data as well as a hash of itself. Further, genesis block 100 includes network clock block NT1 from network clock blockchain 126 as genesis block 100 was created by sender terminal 96/98 at time T1. Further, genesis block 100 includes a unique dynamic ID of sender terminal 96/98 that identifies sender terminal 96/98 in network 128 at time T1, which is block GT1 from blockchain 102. Once genesis block 100 is created, sender terminal 96/98 transmits genesis block 100 to first network node one, which is router 104. In step 4006, distributed network node one, which is router 104, receives genesis block 100. Router 104 then generates first node block 106, which is also called router block 106. Router block 106 contains the dynamic network ID of router 104 as data at time T2 as router block 106 was created at time T2. The dynamic network ID of router 104 at time T2 is contained in block 1T2 from blockchain 108. Router block 106 also contains network clock block NT2 as data as router 104 created router block 106 at time T2. The inclusion of network clock block NT2 creates a timestamp indicating when router 104 handled electronic message blockchain 134. Router block 106 also includes a hash of genesis block 100 and a hash of itself. Once created, router 104 forwards the blockchain formed of blocks 100 and 106 and sends them to router 110, which is also referred to as distributed network node two. In step 4008, router 110 receives the electronic message blockchain formed of blocks 100 and 106. Router 110 then creates router block 112 at time T3. Router block 112, also referred to as second node block 112, includes the dynamic ID of router 110 at time T3 as data. The dynamic ID of router 110 at time T3 is contained as data within block 2T3 in blockchain 114, which is included as data within block 112. As router block 112 is created at time T3, network clock block NT3 is included as data to record that time within router block 112. Router block 112 also includes a hash of block 106 and a hash of itself. Router 110 then forwards the blockchain formed of blocks 100, 106, and 112 to recipient terminal 116/118. In step 4010, recipient terminal 116/118 receives the electronic message blockchain formed of blocks 100, 106 and 112. Recipient terminal 116/118 then forms recipient block 120 at time T4. Recipient block 120 includes the unique dynamic network ID of recipient node 116/118 at time T4 as data. The unique dynamic network ID of recipient node 116/118 at time T4 is stored in block RT4 in blockchain 122. As recipient block 120 was created at time T4, recipient block 120 also includes network clock block NT4 as data to record the time T4 that recipient block 120 was created. Recipient terminal 116/118 then extracts the electronic message from genesis block 100. Master terminal 126, together with recipient terminal 116/118, can then extract the path that electronic message blockchain 134 followed through network 128 between the sender 96/98 and receiver 116/118. Master terminal 126 can compare this extracted path information to stored topographic network information of network 128 to determine if electronic message blockchain 134 followed a valid path through the network or not, thereby indicating whether blockchain 134 was hacked, tampered with, or intercepted. Master terminal 126 can also extract timing information from electronic message blockchain 134 that is recorded in network clock blocks NT1, NT2, NT3, and NT4 within blocks 100, 106, 112, and 120. This timing information can indicate whether electronic message blockchain 134 was transmitted through network 128 within expected speed parameters. Transmitting blockchain 134 within expected speed parameters would indicate that it was not intercepted, hacked, or tampered with. If blockchain 134 was transmitted outside of the expected speed parameters that is an indication that blockchain 134 was intercepted, hacked, or tampered with. As blockchain 134 includes blockchain blocks from two separate timing blockchains 126 and 102, 108, 114, or 122, blockchain 134 is referred to as a triple helical blockchain.

Figure 16:
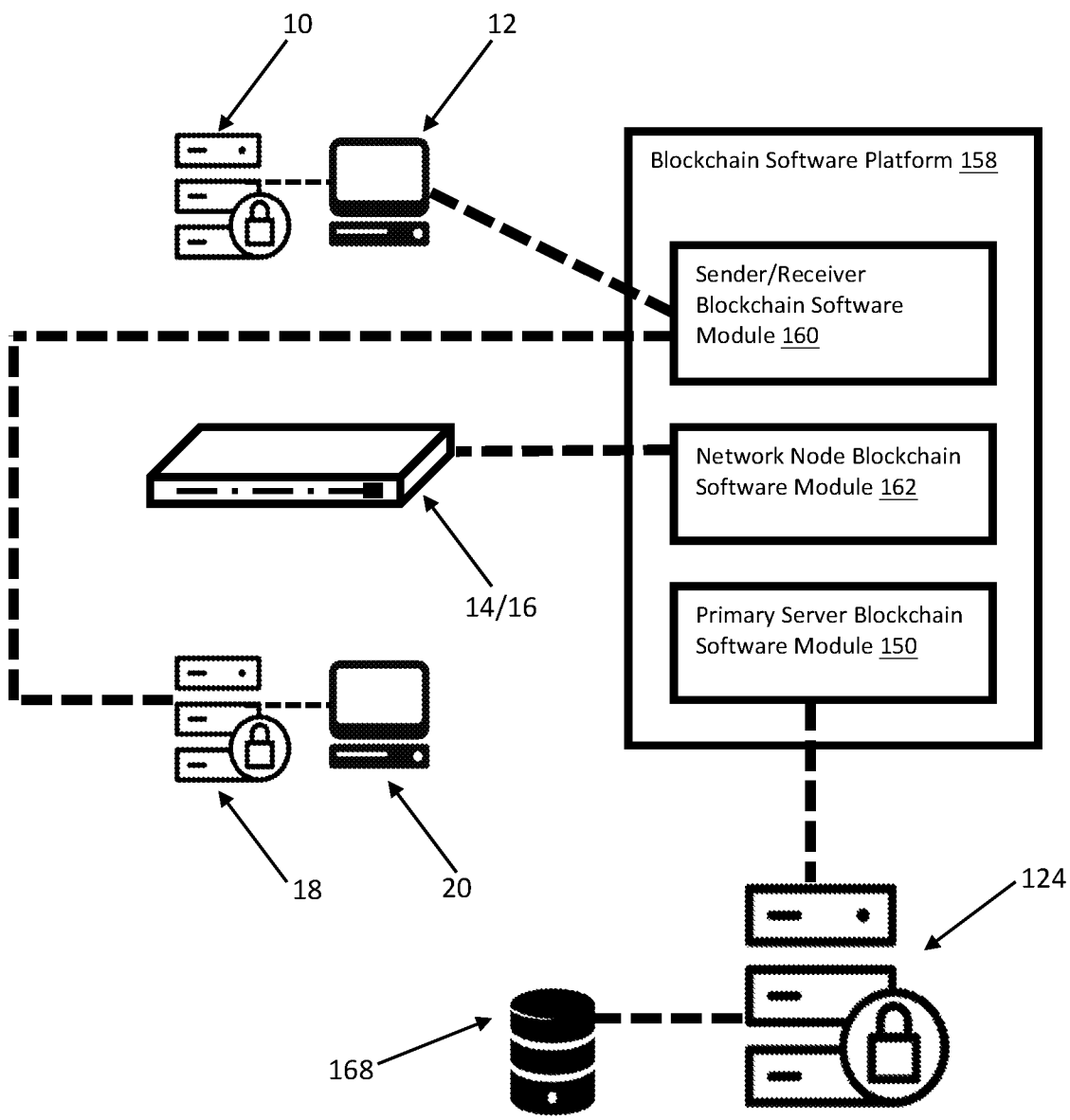
FIG. 16 illustrates a block diagram showing the blockchain software program and its various modules in combination with the network sender, router nodes, network receiver, and master server.

FIG. 16 illustrates a block diagram showing the blockchain software program 158 and its various modules in combination with the network sender 10/12, router nodes 14 and 16, network receiver 18/20, and master server 124 that has persistent storage unit 168. In order to generate and transmit blocks in the electronic message blockchain, all nodes within distributed network 128 include associated software 158 that creates the needed blocks for the electronic message blockchain. Blockchain software platform 158 includes a sender/receiver blockchain module 160 that supports all functionality regarding the creation and usage of sender and receiver blocks of the electronic message blockchain by sender terminal 10/12 and receiver terminal 18/20 as described in FIGS. 1-15. Blockchain software platform 158 includes a network node blockchain software module 162 that supports all functionality regarding the creation and usage of router blocks that form part of the electronic message blockchain by routers 14 and 16. Blockchain software platform 158 includes a primary server blockchain module 150 that supports all functionality regarding the creation and usage of the network clock blockchain as well as all security functions in analyzing the electronic message blockchain with respect to the transmission path and timing information regarding the transmission of the electronic message blockchain. Together, modules 150, 160 and 162 within platform 158 support all functionality regarding the generation, transmission and usage of the electronic message blockchain within distributed network 128.

Figure 17:
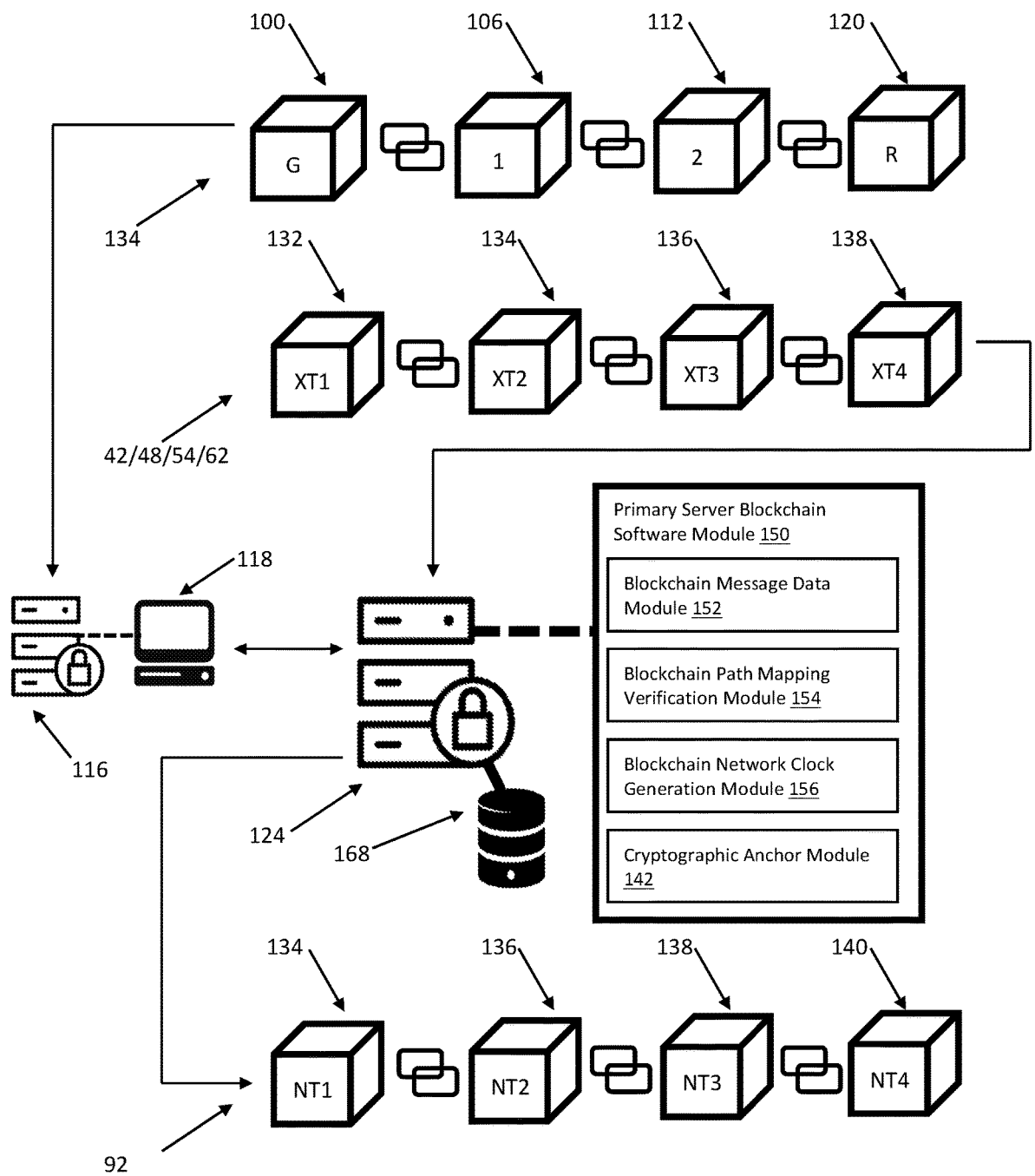
FIG. 17 illustrates a block diagram showing the master server and the message blockchain it receives from a network recipient, the dynamic ID blockchains it receives from all network nodes, and the network clock blockchain that it produces and provides to all network nodes.

FIG. 17 illustrates a block diagram showing the master server 124 and the message blockchain 134 it receives from a network recipient 166/118, the dynamic ID blockchains 42, 48, 54, and 62 it receives from all network nodes, and the network clock blockchain 92 that it produces and provides to all network nodes. Server 124 includes a persistent data store 168. Persistent data store 168 stores data of the topographic map of distributed network 128. Persistent data store 168 also stores copies of electronic message blockchain 134, dynamic ID blockchains 42, 48, 54, and 62, and network clock blockchain 92. Persistent data store 168 also stores all static IDs of all network nodes within network 128. Primary server blockchain software module 150 includes a variety of sub-modules. Blockchain message data module 152 allows server 124 to interrogate and extract all data contained within all blockchains that exist within distributed network 128, including electronic message blockchain 134, dynamic ID blockchains 42, 48, 54, and 62, and network clock blockchain 92. Blockchain message data module 152 allows server 124 to extract the electronic message stored as data within genesis block 100. Blockchain message data module 152 allows server 124 to extract all timing information within blockchain 134 stored in blocks NT1, NT2, NT3, and NT4. Blockchain message data module 152 allows server 124 to extract all network node information stored in the static or dynamic identifying information contained within blockchain 134 or blocks 132, 134, 136, or 138. Blockchain path mapping verification module 154 utilizes stored topographic map data of distributed network 128 and stored dynamic and static identifying information of all nodes in distributed network 128 to analyze the stored data in electronic message blockchain 134 to determine whether electronic message blockchain 134 was hacked, tampered with, or intercepted. Blockchain path mapping verification module 154 utilizes the static or dynamic identifying information of the nodes that handled electronic message 134 extracted from blockchain 134 by blockchain message data module 152 to determine the actual path that electronic message blockchain 134 followed through network 128. Master terminal 124 can compare this extracted path information to stored topographic network information of network 128 to determine if electronic message blockchain 134 followed a valid path through the network or not, thereby indicating whether blockchain 134 was hacked, tampered with, or intercepted. For example, if the actual path of electronic message blockchain 134 through network 128 has gaps indicating that it skipped a network node, so that the path is not contiguous, that shows electronic message blockchain 134 was intercepted. Master terminal 124 can also extract timing information from electronic message blockchain 134 that is recorded in network clock blocks NT1, NT2, NT3, and NT4 within blocks 100, 106, 112, and 120 with blockchain message data module 152. This timing information can indicate whether electronic message blockchain 134 was transmitted through network 128 under expected speed parameters. Transmitting blockchain 134 under expected speed parameters would indicate that it was not intercepted, hacked, or tampered with. If blockchain 134 was transmitted outside of the expected speed parameters, that is an indication blockchain 134 was intercepted, hacked, or tampered with. Blockchain network block generation module 156 allows server 124 to generate network clock blockchain 92 and distribute it to all nodes in network 128. Cryptographic anchor module 142 is the software portion of the cryptographic anchors 142, which are tamper-resistant digital fingerprints that are linked to the blockchain that aid to verify the authenticity of the identifying device information. Cryptographic anchors 142 may be based upon Global Positioning System (GPS) position information, static or dynamic network ID information, or hardware device information based upon device model information or serial number information. Primary server 124 includes a cryptographic anchor 142. In combination, sub-modules 142, 152, 154, and 156 support primary server blockchain software module 150 with managing all blockchain functionality of primary server 124 within distributed network 128.

Figure 18:
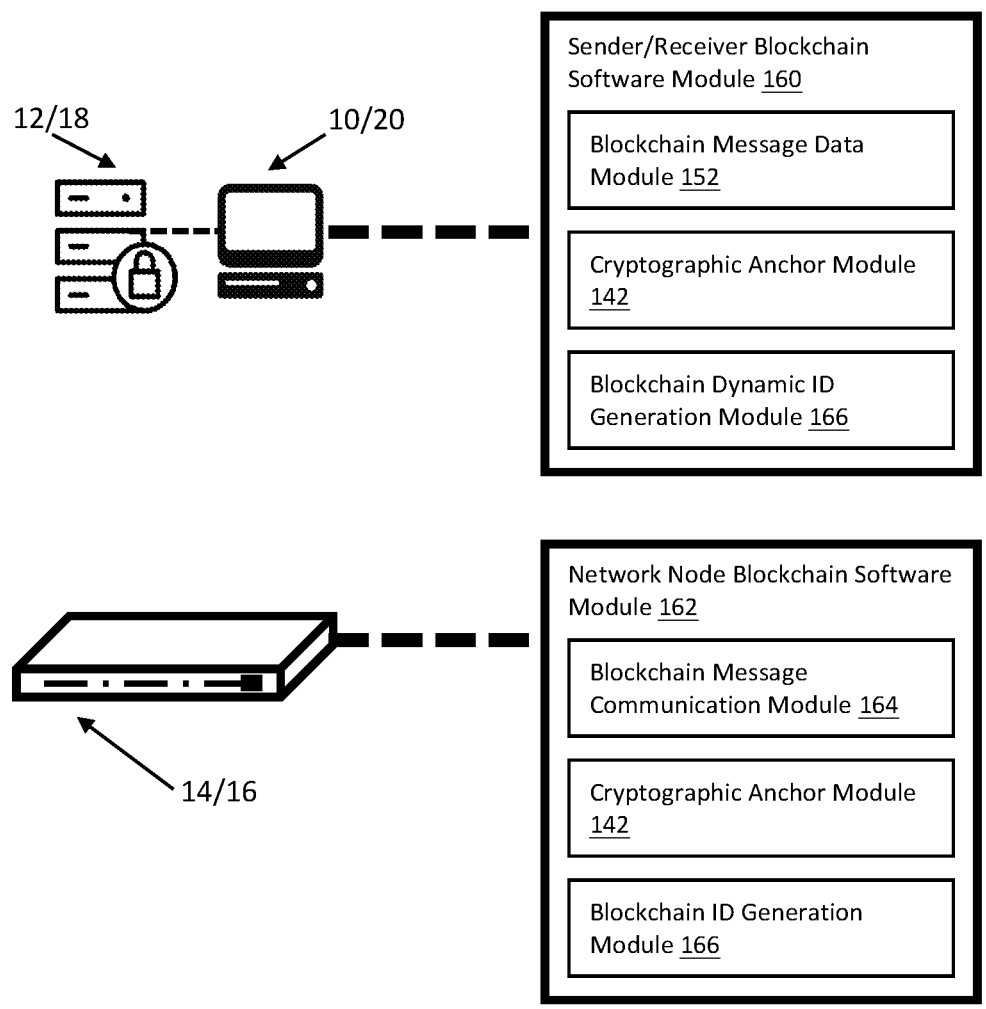
FIG. 18 illustrates the sender/receiver blockchain software module and the network node blockchain software module along with their respective hardware components.

FIG. 18 illustrates the sender/receiver blockchain software module 160 and the network node blockchain software module 162 along with their respective hardware components 12/18 and 10/20, and, 14 and 16. Sender/receiver blockchain software module 160 supports all blockchain functionality of sender node 10/12 and recipient node 18/20 as discussed with respect to FIGS. 1-22. Sender/receiver blockchain software module 160 allows for the creation of genesis block 100 and the inclusion of electronic messages within genesis block 100 as data. Blockchain Message Data Module 152 allows for the inclusion of static or dynamic identifying information of sender node 12/18 within genesis block 100. Blockchain Message Data Module 152 also allows for the inclusion of network block blockchain 92 blocks into genesis block 100. Blockchain Message Data Module 152 allows for the inclusion of the electronic message as data into genesis block 100. Cryptographic anchor module 142 is the software portion of the cryptographic anchors 142, which are tamper-resistant digital fingerprints that are linked to the blockchain that aid to verify the authenticity of the identifying device information. Cryptographic anchors 142 may be based upon Global Positioning System (GPS) position information, static or dynamic network ID information, or hardware device information based upon device model information or serial number information. Sender terminal 10/12 and recipient terminal 18/20 include a cryptographic anchor 142. Blockchain Message Data Module 152 allows for the inclusion of static or dynamic identifying information of recipient node 18/20 within recipient block 120. Blockchain Message Data Module 152 also allows for the inclusion of network block blockchain 92 blocks into recipient block 120. Blockchain Message Data Module 152 allows recipient terminal 18/20 to extract the electronic message from the data portion of genesis block 100 and provide it to the user for reading. Blockchain Dynamic ID Generation Module 166 creates static IDs or dynamic ID blockchains 42 and 62 for sender terminal 10/12 and recipient terminal 18/20. Network Node Blockchain Software Module 162 supports all blockchain functionality of routers 14 and 16 as discussed with respect to FIGS. 1-22. Cryptographic anchor module 142 is the software portion of the cryptographic anchors 142, which are tamper-resistant digital fingerprints that are linked to the blockchain that aid to verify the authenticity of the identifying device information. Cryptographic anchors 142 may be based upon Global Positioning System (GPS) position information, static or dynamic network ID information, or hardware device information based upon device model information or serial number information. Routers 14 and 16 each include a cryptographic anchor 142. Blockchain Dynamic ID Generation Module 166 creates static IDs or dynamic ID blockchains 48 and 54 for routers 14 and 16. Blockchain message communication module 164 allows routers 14 and 16 to send and receive blockchains through network 128.

Figure 19:
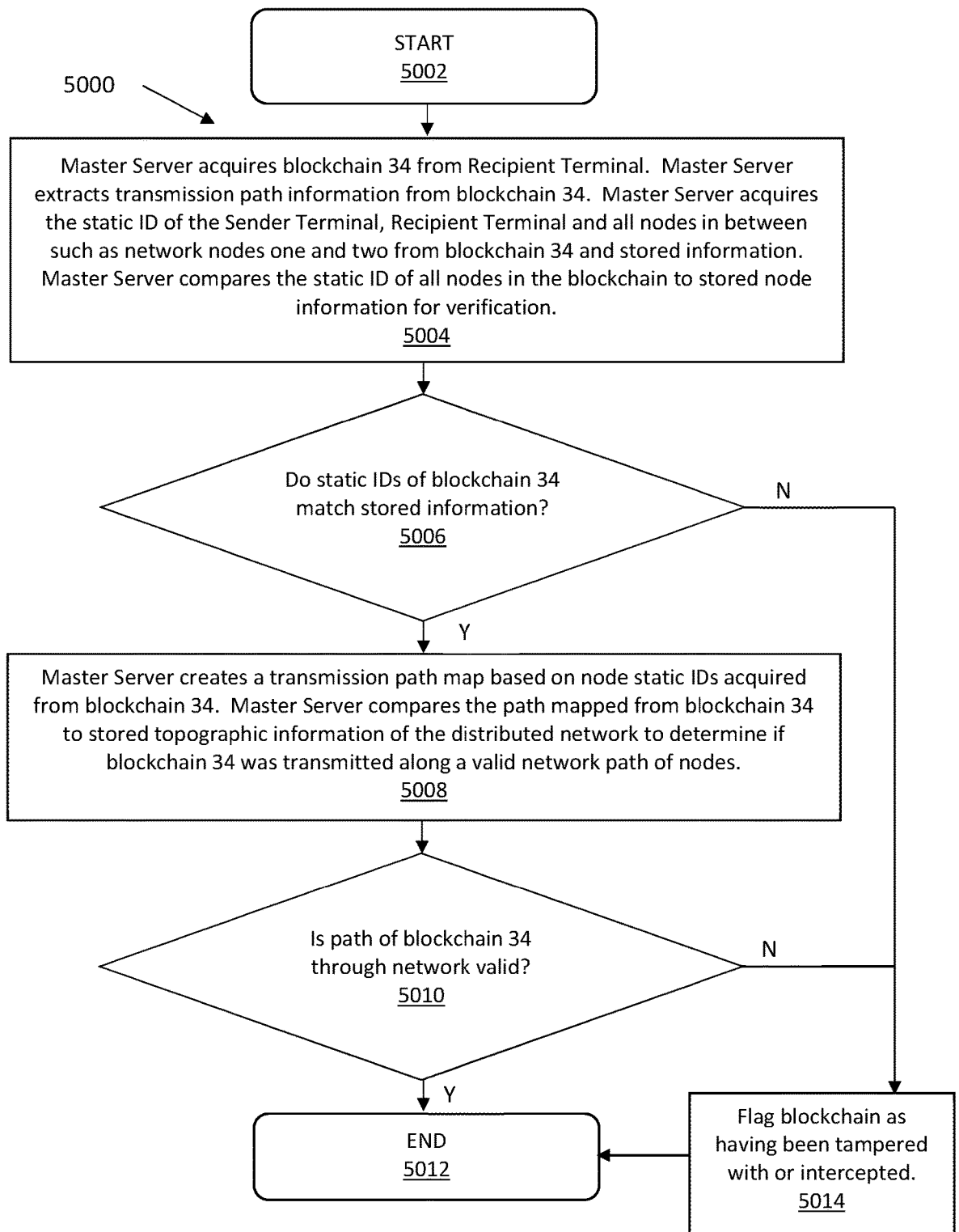
FIG. 19 illustrates a security verification process where the static ID information and message transmission path are verified with respect to stored information.

FIG. 19 illustrates a flow chart 5000 depicting a security verification process where the static ID information and message transmission path are verified with respect to stored information. The process begins with START 5002. In step 5004, master server 64 acquires blockchain 34 from recipient terminal 18/20. Master server 64 extracts transmission path information from blockchain 34. Master server 64 acquires the static ID of the sender terminal 10/12, recipient terminal 18/20 and all nodes in between such as network nodes one and two 14 and 16 from blockchain 34 and stored information. Master server 64 compares the static ID of all nodes in the blockchain 34 to stored node information in persistent store 168 for verification. In step 5006, primary server 64 determines whether the static IDs extracted from blockchain 34 match the stored static ID information contained within primary server 64. If the extracted and stored static ID information do not match, in step 5014, primary server 64 flags blockchain 34 as having been tampered with, hacked, or intercepted. After step 5014, the process ENDS with step 5012. If the extracted and stored static ID information do match, in step 5008, primary server 64 creates a transmission path map based on node static IDs acquired from blockchain 34. Master server 64, also referred to as a primary server, compares the extracted path mapped from blockchain 34 to stored topographic information of the distributed network within primary server 64 to determine if blockchain 34 was transmitted along a valid network path of nodes. In step 5010, server 64 determines whether the path of blockchain 34 through network 128 is valid. An invalid path is one in which there is not a contiguous path of nodes through network 128, which shows that the communication traffic was hijacked and diverted to a node outside of network 128. If the extracted path information indicates an invalid path was taken based on a comparison to stored topographic information of network 128, in step 5014, primary server 64 flags blockchain 34 as having been tampered with, hacked, or intercepted. After step 5014, the process ENDS with step 5012. If the extracted path information indicates a valid path was taken based on a comparison to stored topographic information of network 128, then the process ENDS in step 5012 without flagging electronic message blockchain 34 as having been tampered with, hacked, or intercepted.

Figure 20:
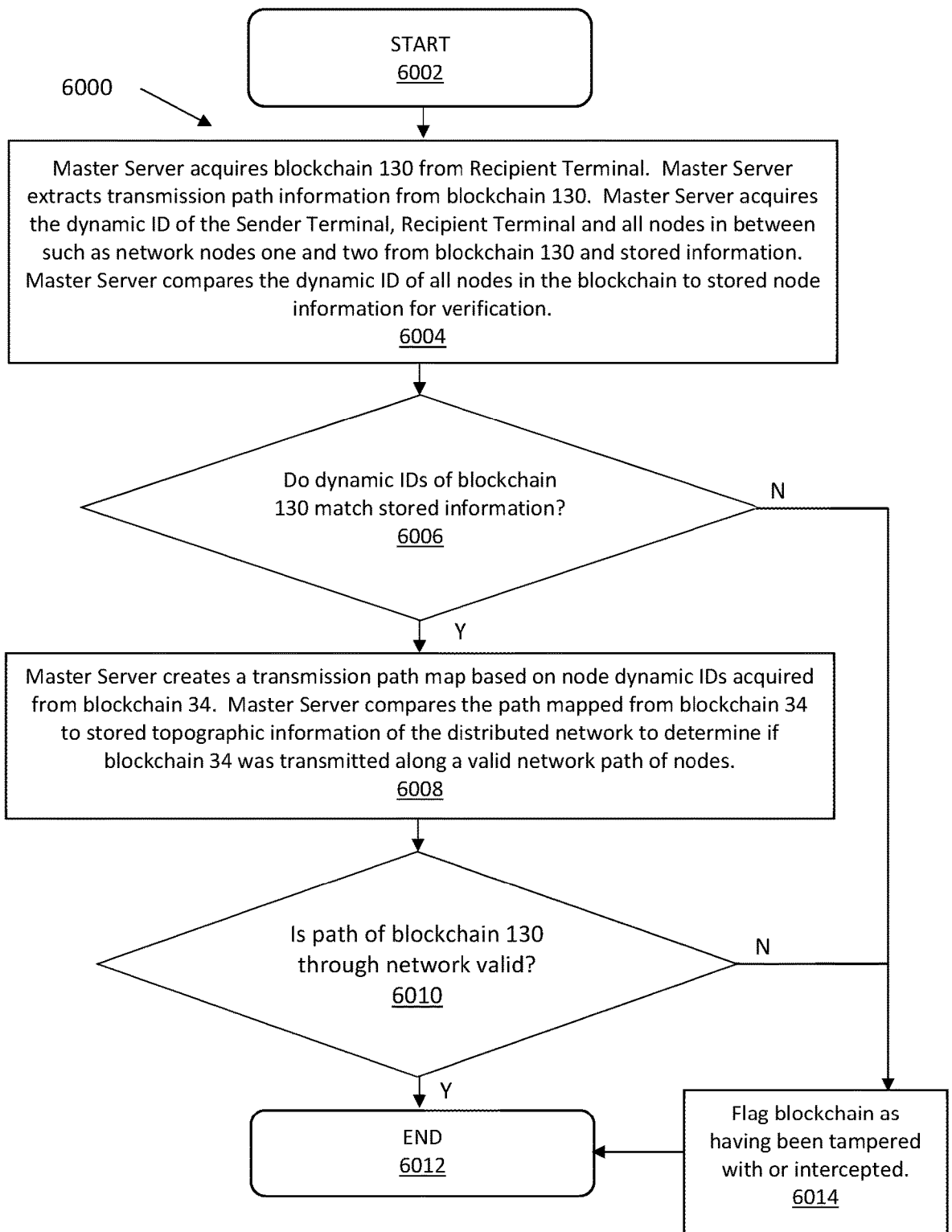
FIG. 20 illustrates a security verification process where the dynamic ID information and message transmission path are verified with respect to stored information.

FIG. 20 illustrates a flow chart 6000 depicting a security verification process where the dynamic ID information and message transmission path are verified with respect to stored information. The process begins with START 6002. In step 6004, Master server 64 acquires blockchain 130 from recipient terminal 56/58. Master server 64 extracts transmission path information from blockchain 130. Master server 64 acquires the dynamic ID of the sender terminal 36/38, recipient terminal 56/58 and all nodes in between such as network nodes one and two 44 and 50 from blockchain 130 and stored information. Master server 64 compares the dynamic ID of all nodes in the blockchain 130 to stored node information in persistent store 168 for verification. In step 6006, primary server 64 determines whether the dynamic IDs extracted from blockchain 130 matches the stored dynamic ID blockchain information contained within primary server 64. If the extracted and stored dynamic ID blockchain information do not match, in step 6014, primary server 64 flags blockchain 130 as having been tampered with, hacked, or intercepted. After step 6014, the process ENDS with step 6012. If the extracted and stored dynamic ID blockchain information do match, in step 6008, primary server 64 creates a transmission path map based on node dynamic ID blockchain information acquired from blockchain 130. Master server 64, also referred to as a primary server, compares the extracted path mapped from blockchain 130 to stored topographic information of the distributed network within primary server 64 to determine if blockchain 130 was transmitted along a valid network path of nodes. In step 6010, server 64 determines whether the path of blockchain 130 through network 128 is valid. An invalid path is one in which there is not a contiguous path of nodes through network 128, which shows that the communication traffic was hijacked and diverted to a node outside of network 128. If the extracted path information indicates an invalid path was taken, based on a comparison to stored topographic information of network 128, in step 6014, primary server 64 flags blockchain 130 as having been tampered with, hacked, or intercepted. After step 6014, the process ENDS with step 6012. If the extracted path information indicates a valid path was taken based on a comparison to stored topographic information of network 128, then the process ENDS in step 5012 without flagging electronic message blockchain 130 as having been tampered with, hacked, or intercepted.

Figure 21:
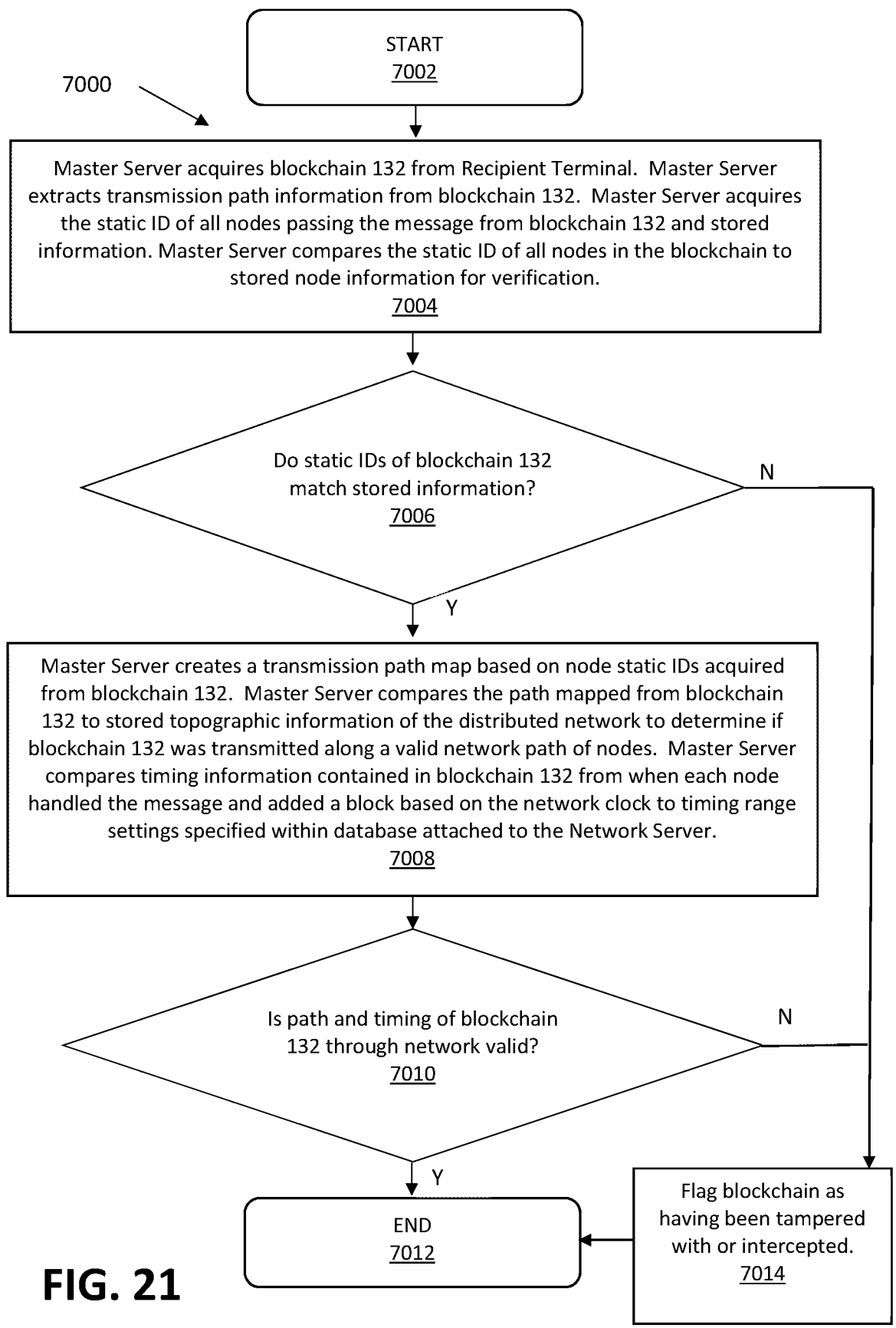
FIG. 21 illustrates a security verification process where the static ID information, message transmission path, and message timing information are verified with respect to stored information.

FIG. 21 illustrates a flow chart 7000 depicting a security verification process where the static ID information, message transmission path, and message timing information are verified with respect to stored information. The process begins with START 7002. In step 7004, master server 94 acquires blockchain 132 from recipient terminal 86/88. Master server 94 extracts transmission path information from blockchain 132. Master server 94 acquires the static ID of the sender terminal 66/68, recipient terminal 86/88 and all nodes in between such as network nodes one and two 74 and 80 from blockchain 132 and stored information. Master server 94 extracts network clock blockchain timing information from blockchain 132. Master server 94 compares the static ID of all nodes in the blockchain 132 to stored node information in persistent store 168 for verification. In step 7006, primary server 94 determines whether the static IDs extracted from blockchain 132 matches the stored static ID information contained within primary server 94. If the extracted and stored static ID information do not match, in step 7014, primary server 94 flags blockchain 132 as having been tampered with, hacked, or intercepted. After step 7014, the process ENDS with step 7012. If the extracted and stored static ID information do match, in step 7008, primary server 94 creates a transmission path map based on node static IDs acquired from blockchain 132. Master server 94, also referred to as a primary server, compares the path mapped from blockchain 132 to stored topographic information of the distributed network within primary server 94 to determine if blockchain 132 was transmitted along a valid network path of nodes. Master server 94 also determines whether the network clock timing information extracted from network clock blockchain 92 falls within specified timing parameters. In step 7010, server 94 determines whether the path of blockchain 132 through network 128 is valid. An invalid path is one in which there is not a contiguous path of nodes through network 128, which shows that the communication traffic was hijacked and diverted to a node outside of network 128. If the extracted path information indicates an invalid path was taken based on a comparison to stored topographic information of network 128, in step 7014, primary server 94 flags blockchain 132 as having been tampered with, hacked, or intercepted. After step 7014, the process ENDS with step 7012. If the extracted path information indicates a valid path was taken based on a comparison to stored topographic information of network 128, then the process ENDS in step 7012 without flagging electronic message blockchain 132 as having been tampered with, hacked, or intercepted. In step 7010, server 94 also determines whether the timing of blockchain 132 through network 128 is valid based on specified parameters. If the time blockchain 132 took to pass between nodes of network 128 exceeded a specified time parameter, then the timing parameter is violated and not valid and primary server 94 flags blockchain 132 as having been tampered with, hacked, or intercepted. After step 7014, the process ENDS with step 7012. If the time blockchain 132 took to pass between nodes of network 128 does not exceed a specified time parameter, then the timing parameter is valid and primary server 94 does not flag blockchain 132. The process then ENDS with step 7012.

Figure 22:
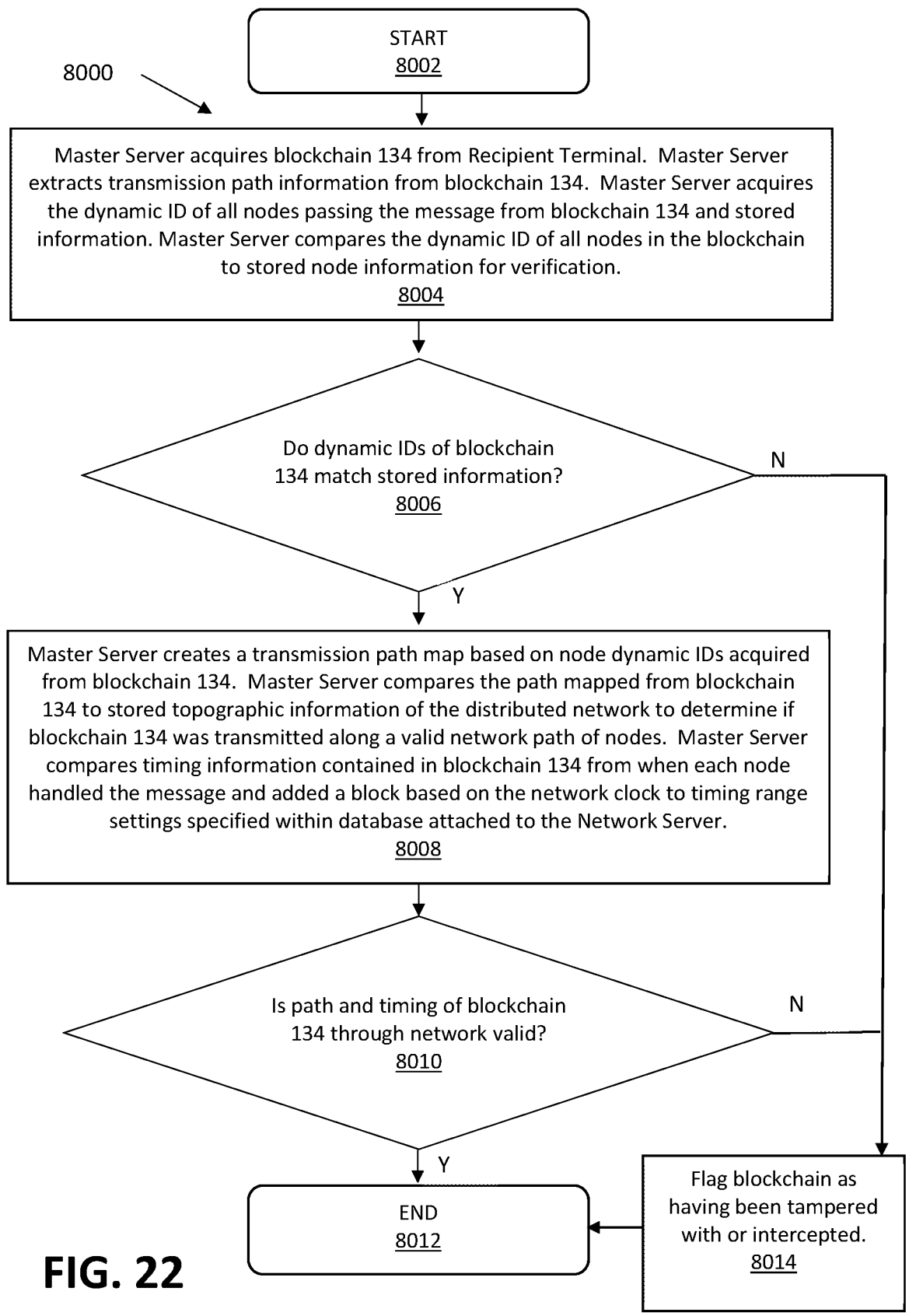
FIG. 22 illustrates a security verification process where the dynamic ID information, message transmission path, and message timing information are verified with respect to stored information.

FIG. 22 illustrates a flow chart 8000 depicting a security verification process where the dynamic ID information, message transmission path, and message timing information are verified with respect to stored information. The process begins with START 8002. In step 8004, master server 124 acquires blockchain 134 from recipient terminal 96/98. Master server 124 extracts transmission path information from blockchain 134. Master server 124 acquires the dynamic ID blockchain information of sender terminal 96/98, recipient terminal 116/118 and all nodes in between such as network nodes one and two 104 and 110 from blockchain 134 and stored information. Master server 124 extracts network clock blockchain timing information from blockchain 134. Master server 124 compares the dynamic ID blockchain information of all nodes in the blockchain 134 to stored node information in persistent store 168 for verification. In step 8006, primary server 124 determines whether the dynamic ID blockchain information extracted from blockchain 134 matches the stored dynamic ID blockchain information contained within primary server 124. If the extracted and stored dynamic ID blockchain information do not match, in step 8014, primary server 124 flags blockchain 134 as having been tampered with, hacked, or intercepted. After step 8014, the process ENDS with step 8012. If the extracted and stored dynamic ID blockchain information do match, in step 8008, primary server 124 creates a transmission path map based on node dynamic ID blockchain formation acquired from blockchain 134. Master server 124, also referred to as a primary server, compares the path mapped from blockchain 134 to stored topographic information of the distributed network within primary server 124 to determine if blockchain 134 was transmitted along a valid network path of nodes. Master server 124 also determines whether the network clock timing information extracted from network clock blockchain 126 falls within specified timing parameters. In step 8010, server 124 determines whether the path of blockchain 134 through network 128 is valid. An invalid path is one in which there is not a contiguous path of nodes through network 128, which shows that the communication traffic was hijacked and diverted to a node outside of network 128. If the extracted path information indicates an invalid path was taken based on a comparison to stored topographic information of network 128, in step 8014, primary server 124 flags blockchain 134 as having been tampered with, hacked, or intercepted. After step 8014, the process ENDS with step 7012. If the extracted path information indicates a valid path was taken based on a comparison to stored topographic information of network 128, then the process ENDS in step 8012 without flagging electronic message blockchain 134 as having been tampered with, hacked, or intercepted. In step 8010, server 124 also determines whether the timing of blockchain 134 through network 128 is valid based on specified parameters. If the time blockchain 134 took to pass between nodes of network 128 fell below a specified time parameter, then the timing parameter is violated and not valid and primary server 124 flags blockchain 134 as having been tampered with, hacked, or intercepted. After step 8014, the process ENDS with step 8012. If the time blockchain 134 took to pass between nodes of network 128 does not fall below a specified time parameter, then the timing parameter is valid and primary server 124 does not flag blockchain 134. The process then ENDS with step 8012.

While the invention has been shown and described with reference to a particular embodiment thereof, it will be understood to those skilled in the art, that various changes in form and details may be made therein without departing from the spirit and scope of the invention.

I claim:

1. A blockchain method for sending an electronic message across a distributed network, comprising:
   transmitting an electronic message across nodes of a distributed network in a single blockchain from a sender node to a receiver node, wherein the single blockchain begins with a genesis blockchain block generated by the sender node that contains the electronic message, wherein the single blockchain ends with a terminating blockchain block generated by the receiver node, wherein intermediate blockchain blocks link the genesis blockchain block to the terminating blockchain block that are each generated by a separate routing node that routed the electronic message from the sender node to the receiver node.

2. The method of claim 1, wherein the genesis blockchain block contains device information about the sender node, wherein the terminating blockchain block contains device information about the receiver node, wherein each intermediate blockchain block contains device information about an individual routing node.

3. The method of claim 1, wherein intermediate blockchain block is generated by a separate routing node after it is received by that routing node and appended to the single blockchain before forwarding the electronic message to another node in the distributed network in route to the receiver node.

4. The method of claim 2, wherein a transmission path of the electronic message from the sender node to the receiver node across the distributed network may be determined by extracting the device information on the sender node, routing nodes, and receiver node from the blockchain blocks forming the single blockchain.

5. The method of claim 4, further comprising:
   comparing the transmission path to stored distributed network information; and
   generating an electronic alert message when the transmission path does not match the stored distributed network information.

6. The method of claim 4, wherein the transmission path extracted from the single blockchain may be compared to stored topographic information of the distributed network to determine if the transmission path is a valid path through the distributed network.

7. The method of claim 1, wherein every node of the distributed network that handled the electronic message generates a separate blockchain block in the single blockchain.

8. The method of claim 7, wherein the electronic message includes a sender address, a receiver address, and message data, wherein the message data is selected from the group consisting of text, images, video, code, code updates, spreadsheets, biometric-data, metadata, applications, network communication singles, security data, and any other form of electronic data or software.

9. The method of claim 1, wherein each blockchain block of the single blockchain includes time stamp information from a network clock blockchain that is distributed to all nodes of the distributed network.

10. The method of claim 9, wherein at the receiver node, the time stamp information from each blockchain block of the single blockchain may be extracted for comparison to the network clock blockchain to determine if the extracted time stamp information for each blockchain block is valid.

11. The method of claim 10, wherein at the receiver node, the time stamp information from each blockchain block of the single blockchain may be extracted for comparison to the network clock blockchain to determine if a gap in time exists in the transmission of the electronic message through the distributed network.

12. A non-transitory computer tangible medium containing instructions for transmitting an electronic message across a distributed network with a blockchain, comprising:
    transmitting an electronic message across nodes of a distributed network in a blockchain from a sender node to a receiver node, wherein the blockchain begins with a genesis blockchain block generated by the sender node that stores the electronic message and ends with a terminating blockchain block that is generated by the receiver node when it receives the electronic message, wherein the blockchain includes intermediate blockchain blocks that interconnect the genesis blockchain block to the terminating blockchain block that are each generated by a separate network node that routes the electronic message from the sender node to the receiver node, thereby creating a record of the transmission path of the electronic message from the sender node to the receiver node.

13. The medium of claim 12, wherein the transmission path is extracted from the blockchain for comparison to stored topographic information of the distributed network to determine if the transmission path is a valid path through the distributed network.

14. A method for generating a single blockchain through transmission of an electronic message through a distributed network, comprising:
    creating a single blockchain recording a transmission path of an electronic message through a distributed network by:
        generating a genesis blockchain block at a sender node to contain an electronic message for transmission from the sender node to a receiver node;
        generating a separate routing blockchain block at every node of the distributed network that routes the electronic message to the receiver node; and
        generating a terminating blockchain block at the receiver node when it receives the electronic message that ends the single blockchain.

15. The method of claim 14, further comprising storing device information for each node of the distributed network separately in one of the blockchain blocks forming the single blockchain, thereby allowing the transmission path of the electronic message to be determined by extracting that device information at the receiver node from all of the blockchain blocks of the single blockchain.

16. The method of claim 15, wherein the transmission path extracted from the single blockchain may be compared to stored topographic information of the distributed network to determine if the transmission path is a valid path through the distributed network.

17. The method of claim 16, wherein the electronic message includes a sender address, a receiver address, and message data, wherein the message data is selected from the group consisting of text, images, video, code, code updates, spreadsheets, biometric-data, metadata, applications, network communication singles, security data, and any other form of electronic data or software.

18. The method of claim 14, wherein each blockchain block of the single blockchain includes time stamp information from a network clock blockchain that is distributed to all nodes of the distributed network.

19. The method of claim 18, wherein at the receiver node, the time stamp information from each blockchain block of the single blockchain may be extracted for comparison to the network clock blockchain to determine if the extracted time stamp information for each blockchain block is valid.

20. The method of claim 18, wherein at the receiver node, the time stamp information from each blockchain block of the single blockchain may be extracted for comparison to the network clock blockchain to determine if a gap in time exists in the transmission of the electronic message through the distributed network.

* * * * *